(12) United States Patent
Bassi et al.

(10) Patent No.: US 11,177,743 B2
(45) Date of Patent: *Nov. 16, 2021

(54) SYSTEM FOR VOLTAGE LEVEL GENERATION IN A SWITCHED SERIES/PARALLEL SOURCES HYBRID MULTI-LEVEL INVERTER

(71) Applicant: King Abdulaziz University, Jeddah (SA)

(72) Inventors: Hussain Mohammad Bassi, Jeddah (SA); Zainal Salam, Jeddah (SA)

(73) Assignee: King Abdulaziz University, Jeddah (SA)

(*) Notice: Subject to any disclaimer, the term of this patent is extended or adjusted under 35 U.S.C. 154(b) by 0 days.

This patent is subject to a terminal disclaimer.

(21) Appl. No.: 17/242,499

(22) Filed: Apr. 28, 2021

(65) Prior Publication Data

US 2021/0249968 A1    Aug. 12, 2021

Related U.S. Application Data

(63) Continuation of application No. 16/725,312, filed on Dec. 23, 2019, now Pat. No. 11,070,141.

(51) Int. Cl.
*H02M 7/10* (2006.01)
*H02M 7/44* (2006.01)
(Continued)

(52) U.S. Cl.
CPC ........... *H02M 7/10* (2013.01); *H02M 1/0012* (2021.05); *H02M 1/0095* (2021.05); *H02M 7/44* (2013.01);
(Continued)

(58) Field of Classification Search
CPC .... H02M 7/217; H02M 7/5387; H02M 7/483; H02M 7/53871; H02M 7/44; H02M 7/10;
(Continued)

(56) References Cited

U.S. PATENT DOCUMENTS 9,870,016 B2    1/2018  Adest
10,396,681 B1   8/2019  Bassi et al.
(Continued)

FOREIGN PATENT DOCUMENTS

JP    2010213562 A  *  9/2010

OTHER PUBLICATIONS

Youhei Hinago; Hirotaka Koizumi; "A single phase multilevel inverter using switched series/parallel DC voltage sources"; IEEE; Nov. 6, 2009; pp. 2643-2650 (Year: 2009).*
(Continued)

*Primary Examiner* — Thienvu V Tran
*Assistant Examiner* — Shahzeb K Ahmad
(74) *Attorney, Agent, or Firm* — Oblon, McClelland, Maier & Neustadt, L.L.P.

(57) ABSTRACT

A single-phase hybrid multilevel inverter capable of producing a higher number of output voltage levels using fewer power switches and DC voltage sources compared to existing multilevel inverters. The levels are synthesized by switching the DC voltage sources in series/parallel combinations. An auxiliary circuit is introduced to double the number of levels by creating an intermediate step in between two levels. In addition, a zero level is introduced to overcome the inherent absence of this level in the original circuit. To improve the total harmonic distortion, a hybrid modulation technique is utilized. A 300 W, a thirteen level multilevel inverter (including the zero level) was designed and constructed. The circuit was tested with a no-load, resistive load and resistive-inductive load. The experimental results closely match simulated and mathematical analyses.

4 Claims, 36 Drawing Sheets

(51) Int. Cl.
*H02M 7/5387* (2007.01)
*H02M 1/00* (2006.01)
*H02M 7/49* (2007.01)
*H02M 1/32* (2007.01)

(52) U.S. Cl.
CPC .......... *H02M 7/49* (2013.01); *H02M 7/5387* (2013.01); *H02M 1/325* (2021.05)

(58) Field of Classification Search
CPC ... H02M 2001/0058; H02M 2001/007; H02M 2001/325; H02M 1/12; H02M 3/158; H02M 3/335; H02M 7/49; H02M 7/5395; H02M 1/0095; H02M 1/0012; H02M 1/325; H02J 50/12; H02J 50/90; H02J 7/025; H02J 1/00; H02J 1/082
See application file for complete search history.

(56) References Cited

U.S. PATENT DOCUMENTS

| | | | | |
|---|---|---|---|---|
| 2011/0254373 | A1* | 10/2011 | Johnson | H02M 7/483 307/77 |
| 2013/0014384 | A1* | 1/2013 | Xue | H02M 7/483 29/825 |
| 2019/0131886 | A1 | 5/2019 | Bassi et al. | |
| 2020/0195125 | A1 | 6/2020 | Slepchenkov | |
| 2020/0350821 | A1* | 11/2020 | Cannillo | H02M 3/1584 |

OTHER PUBLICATIONS

Ebrahim Babaei; Sara Laali; Zahra Bayat; "A Single-Phase Cascaded Multilevel Inverter Based on a New Basic Unit With Reduced Number of Power Switches"; IEEE; Jul. 8, 2014; pp. 922-929 (Year: 2014).*

Javad Ebrahimi; Ebrahim Babaei; Gevorg B. Gharehpetian; "A New Multilevel Converter Topology With Reduced Number of Power Electronic Components"; IEEE; May 5, 2011; pp. 655-667 (Year: 2011).*

Won-Kyun Choi; Feel-soon Kang; "H-bridge based multilevel inverter using PWM switching function"; IEEE; Dec. 11, 2009; pp. 1-5 (Year: 2009).*

* cited by examiner

SYSTEM FOR VOLTAGE LEVEL GENERATION IN A SWITCHED SERIES/PARALLEL SOURCES HYBRID MULTI-LEVEL INVERTER

CROSS-REFERENCE TO RELATED APPLICATION

The present application is a Continuation of U.S. application Ser. No. 16/725,312, having a filing date of Dec. 23, 2019.

STATEMENT REGARDING PRIOR DISCLOSURE BY THE INVENTORS

Aspects of this technology are described in an article "A New Hybrid Multilevel Inverter Topology with Reduced Switch Count and DC Voltage Sources" published in Energies, MDPI, Open Access Journal, Vol. 12(6), pages 1-15, Mar. 13, 2019, which is incorporated herein by reference in its entirety.

STATEMENT OF ACKNOWLEDGEMENT

The inventors would like to acknowledge the financial support received from the Deanship of Scientific Research (DSR) King Abdulaziz University, Jeddah, under grant No (D-086-829-1437)

BACKGROUND

Technical Field

The present disclosure is directed to a hybrid multilevel inverter having a topology with a high number of DC output levels and a low number of switches and DC voltage sources.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

The growing demand for electrical energy along with environmental concerns regarding the use of fossil fuels has increased the need for renewable energy (RE) resources. These renewable energy resources, particularly solar, wind, ocean thermal, wave and fuel cells, require a power electronics converter to be compatible with different applications. Inverters, which perform DC-AC conversion, are crucial equipment in domestic and industrial power systems. A conventional two-level inverter is inadequate for high voltage/power applications due to drawbacks which include the high voltage ratings of power semiconductor devices (switches and/or power diodes) and a high amount of total harmonic distortion (THD). In certain high fidelity applications, the conventional two-level inverter requires bulky inductors and capacitors to filter the harmonics at the output, which result in a higher cost for the inverter.

Multilevel inverters are power converters which generate a staircase output voltage by an arrangement of power semiconductor devices, such as switches and/or power diodes, with dc voltage links to dc voltage sources or capacitors. A multilevel inverter (MLI) can synthesize higher output voltage waveforms using much lower rated switches. With a higher number of levels, the output voltage waveform comes close to the sinusoidal waveform, thus improving its total harmonic distortion. Consequently, the inverter reduces filter requirements. In addition, a multilevel inverter offers advantages such as lower voltage stress across switches, improved efficiency, reduced dv/dt stress, and lower electromagnetic interference. (See Vijeh, M.; Rezanejad, M.; Samadaei, E.; Bertilsson, K. "A General Review of Multilevel Inverters Based on Main Submodules: Structural Point of View". *IEEE Trans. Power Electron.* 2019; Aganah, K.; Luciano, C.; Ndoye, M.; Murphy, G.; Aganah, K. A.; Luciano, C.; Ndoye, M.; Murphy, G. "New Switched-Dual-Source Multilevel Inverter for Symmetrical and Asymmetrical Operation". *Energies* 2018, 11, 984; Rodriguez, J.; Lai, J.-S.; Peng, F. Z. "Multilevel inverters: A survey of topologies, controls, and applications". *IEEE Trans. Ind. Electron.* 2002, 49, 724-738; Kouro, S.; Malinowski, M.; Gopakumar, K.; Pou, J.; Franquelo, L. G.; Wu, B. W.; Rodriguez, J.; Pérez, M. A.; Leon, J. I. "Recent Advances and Industrial Applications of Multilevel Converters". *IEEE Trans. Ind. Electron.* 2010, 57, 2553-2580; and Akagi, H. "Multilevel Converters: Fundamental Circuits and Systems". *Proc. IEEE* 2017, 105, 2048-2065; Abu-Rub, H., Holtz, J., Rodriguez, J., Ge Baoming: "Medium-Voltage Multilevel Converters: State of the Art, Challenges, and Requirements in Industrial Applications". *IEEE Trans. Ind. Electron.,* 2010, 57, (8), pp. 2581-2596; Rodriguez, J., Leon, J. I., Kouro, S., Portillo, R., Prats, M. A. M.: "The Age of Multilevel Converters Arrives", 2008, (June), pp. 28-39, each incorporated herein by reference in their entirety).

Conventional multilevel inverter topologies include neutral point clamped (NPC), flying capacitor (FC), and cascade H-bridge (CHB) inverters. Theoretically, the neutral point clamped topology can achieve any number of levels at the cost of switches and clamping diodes, while for the flying capacitor a large number of capacitors are needed. As for the cascade H-bridge, higher voltage level is determined by the number of isolated DC voltage sources. To overcome these drawbacks, extensive research has been carried out to search for new multilevel inverter topologies which require a lower number of switches and DC voltage sources to achieve a higher output voltage level. With respect to this aspect, several topologies have been proposed with symmetrical and asymmetrical configurations. For the former, all the DC sources have the same magnitude, while for the latter they are different. The asymmetrical topology produces more levels by using the same number of DC sources and switches compared to the symmetrical configuration. (See Gupta, K. K.; Ranjan, A.; Bhatnagar, P.; Sahu, L. K.; Jain, S. Multilevel Inverter Topologies With Reduced Device Count: A Review. *IEEE Trans. Power Electron.* 2016, 31, 135-151; Zhang, J.; Xu, S.; Din, Z.; Hu, X.; Zhang, J.; Xu, S.; Din, Z.; Hu, X. Hybrid "Multilevel Converters: Topologies, Evolutions and Verifications", *Energies* 2019, 12, 615; Venkataramanaiah, J., Suresh, Y., Panda, A. K.: "A review on symmetric, asymmetric, hybrid and single DC sources based multilevel inverter topologies", Renew. Sustain. Energy Rev., 2017, 76, (July 2016), pp. 788-812, each incorporated herein by reference in their entirety).

Another class of multilevel inverter is the hybrid type. Typically a hybrid type multilevel inverter has two parts. The first part, called the level generation, synthesizes the staircase voltage in unidirectional polarity. This is done by switching the DC sources in a certain combination such that different levels are produced. The second part is the polarity changing part which produces both positive and negative voltage across the load. Generally, an H-bridge inverter is used for this purpose. FIG. 1 shows a single-phase hybrid multilevel inverter proposed by Hinago and Koizumi. (See Hinago, Y.; Koizumi, H. "A Single-Phase Multilevel Inverter Using Switched Series/Parallel DC Voltage Sources". *IEEE Trans. Ind. Electron.* 2010, 57, 2643-2650, incorporated herein by reference in its entirety). In this topology, the DC voltage sources may be connected in series to produce all of the additive combinations. Furthermore, they may also be connected in parallel, which enhances the flexibility of voltage and current requirements at the output. The circuit of FIG. 1 is termed a switched series/parallel sources (SSPS) multilevel inverter.

Another topology based on series connected switched sources (SCSS) has been presented in Lee et al. (See Lee, F. S.; Kang, S. H. "A new structure of H-bridge multilevel inverter". In Proceedings of the KIPE Conference, Jeonnam, Korea, 30 Jun.-3 Jul. 2008; pp. 388-390, incorporated herein by reference in its entirety). As shown in FIG. 2A, this topology does not have the feature of combining two voltage sources in parallel. Therefore, this topology does not possess load sharing capability. Furthermore, it generates fewer levels than the SSPS for the same number of DC sources.

Another hybrid topology based on the SCSS is proposed in Su and is illustrated in FIG. 2B. (See Su, G.-J. "Multilevel DC-Link Inverter". *IEEE Trans. Ind. Appl.* 2005, 41, 848-854, incorporated herein by reference in its entirety). This topology is based on the half-bridge which includes one DC source and two switches. Several such half bridges can be connected to achieve more output voltage levels.

Other alternatives for hybrid multilevel inverter are shown in FIG. 3A-3D. (See Choi, W.-K.; Kang, F. "H-bridge based multilevel inverter using PWM switching function". In Proceedings of the INTELEC 2009—31st International Telecommunications Energy Conference, Incheon, Korea, 18-22 Oct. 2009; pp. 1-5; Samsami, H.; Taheri, A.; Samanbakhsh, R. "New bidirectional multilevel inverter topology with staircase cascading for symmetric and asymmetric structures". *IET Power Electron.* 2017, 10, 1315-1323; Ebrahimi, J.; Babaei, E.; Gharehpetian, G. B. "A New Multilevel Converter Topology With Reduced Number of Power Electronic Components". *IEEE Trans. Ind. Electron.* 2012, 59, 655-667; Babaei, E.; Laali, S.; Bayat, Z. "A Single-Phase Cascaded Multilevel Inverter Based on a New Basic Unit With Reduced Number of Power Switches". *IEEE Trans. Ind. Electron.* 2015, 62, 922-929, each incorporated herein by reference in their entirety). All of these topologies require an additional DC source ($V_{11}$) prior to the H-bridge. Further, the DC voltage sources are directly connected to the H-bridge without using a switch as shown in FIG. 3A-3C. In this type of arrangement, the zero voltage level is generated by using two switches of the H-bridge. Due to this, the switches of the H-bridge do not operate at the fundamental switching frequency. In addition, the voltage source connected just before the H-bridge is highly stressed as it is involved in all voltage levels except zero. This problem is eliminated by making the voltage source $V_{11}$ a half bridge by adding two more switches ($S_{11}$, $S_{22}$) as shown in FIG. 3D. (See Babaei et al. (2015)). Therefore, with this structure, the number of levels is doubled, as there are two connections available, one without DC voltage source $V_{11}$ and other with $V_{11}$.

Several topologies have been proposed which generate both polarities of the output voltage without using a polarity changing circuit. One such multilevel inverter is known as the packed U cell (PUC) multilevel inverter. (See Ounejjar, Y.; Al-Haddad, K. "A new high power efficiency cascaded U cells multilevel converter". In Proceedings of the 2009 IEEE International Symposium on Industrial Electronics, Seoul, Korea, 5-8 Jul. 2009; pp. 483-488; and Ounejjar, Y.; Al-Haddad, K. "A novel high energetic efficiency multilevel topology with reduced impact on supply network". In Proceedings of the 2008 34th Annual Conference of IEEE Industrial Electronics, Orlando, Fla., USA, 10-13 Nov. 2008; pp. 489-494; Gupta, K. K., Jain, S.: "A novel multilevel inverter based on switched dc sources", IEEE Trans. Ind. Electron., 2014,61, (7), pp. 3269-3278; Alishah, R. S., Hosseini, S. H., Babaei, E., Sabahi, M.: "A New General Multilevel Converter Topology Based on Cascaded Connection of Submultilevel Units with Reduced Switching Components, DC Sources, and Blocked Voltage by Switches", IEEE Trans. Ind. Electron., 2016,63, (11), pp. 7157-7164, each incorporated herein by reference in their entirety). However, the packed U cell (PUC) multilevel inverter requires a large variety of DC sources because the voltage levels are generated by subtraction of two or more sources.

Another multilevel inverter topology is based on cascaded bipolar switched cells (CBSC). (See Babaei, E. "A Cascade Multilevel Converter Topology With Reduced Number of Switches". IEEE Trans. Power Electron. 2008, 23, 2657-2664, incorporated herein by reference in its entirety). In the CBSC multilevel inverter, all the switches need to be of bidirectional nature, which increases the complexity significantly. In addition, the switches suffer from higher blocking voltages.

Other topologies similar to the CBSC have been investigated. (See Samadaei, E.; Gholamian, S. A.; Sheikholeslami, A.; Adabi, J. "An Envelope Type (E-Type) Module: Asymmetric Multilevel Inverters With Reduced Components". IEEE Trans. Ind. Electron. 2016, 63, 7148-7156; Samadaei, E.; Sheikholeslami, A.; Gholamian, S. A.; Adabi, J. "A Square T-Type (ST-Type) Module for Asymmetrical Multilevel Inverters". IEEE Trans. Power Electron. 2018, 33, 987-996; Siddique, M. D.; Mekhilef, S.; Shah, N. M.; Memon, M. A. "Optimal Design of a New Cascaded Multilevel Inverter Topology with Reduced Switch Count". IEEE Access 2019, 7, 24498-24510; Alishah, R. S.; Hosseini, S. H.; Babaei, E.; Sabahi, M. "A New General Multilevel Converter Topology Based on Cascaded Connection of Submultilevel Units with Reduced Switching Components, DC Sources, and Blocked Voltage by Switches". IEEE Trans. Ind. Electron. 2016, 63, 7157-7164; Alishah, R. S.; Hosseini, S. H.; Babaei, E.; Sabahi, M. "Optimal Design of New Cascaded Switch-Ladder Multilevel Inverter Structure". IEEE Trans. Ind. Electron. 2017, 64, 2072-2080; Shalchi Alishah, R.; Sabahi, M.; Nazarpour, D.; Hosseini, S. H. "Novel multilevel inverter topologies for medium and high-voltage applications with lower values of blocked voltage by switches". IET Power Electron. 2014, 7, 3062-3071; Shueai Alnamer, S.; Mekhilef, S.; Bin Mokhlis, H.; Shueai Alnamer, S.; Mekhilef, S.; Bin Mokhlis, H. "A Four-Level T-Type Neutral Point Piloted Inverter for Solar Energy Applications". Energies 2018, 11, 1546; and Prabaharan, N.; Arun, V.; Sanjeevikumar, P.; Mihet-Popa, L.; Blaabjerg, F.; Prabaharan, N.; Arun, V.; Sanjeevikumar, P.; Mihet-Popa, L.; Blaabjerg, F. "Reconfiguration of a Multilevel Inverter with Trapezoidal Pulse Width Modulation". Energies 2018, 11, 2148, each incorporated herein by reference in their entirety).

Accordingly, it is one object of the present disclosure to provide a hybrid multilevel inverter, a method for voltage level generation in a multilevel inverter and a system for voltage level generation in a switched series/parallel sources (SSPS) multilevel inverter, which uses fewer switches and further incorporates an auxiliary module between the level generation and polarity changing sections, both of which generate a higher number of levels, which uses load sharing among different DC voltage sources, resulting in equal stress loading across each DC voltage source, and which is further capable of handling inductive loads.

SUMMARY

In an exemplary embodiment, a hybrid multilevel inverter comprises a level generation module; an auxiliary module in series with the level generation module; and a polarity changing unit in series with the level generation module and the auxiliary module; and a controller having circuitry operatively connected to switches located in the level generation module, the auxiliary module and the polarity changing unit.

In another exemplary embodiment, a method for voltage level generation in a hybrid multilevel inverter comprises applying to each switch in a level generation module having k voltage generation cells, by a controller operatively connected to and having program instructions configured for hybrid modulation, k square wave modulation pulses to generate a first voltage level output, applying to each switch in an auxiliary voltage generation module including an auxiliary voltage source, by the controller, a square wave modulation pulse which either places the auxiliary voltage source in series with the first voltage level output or bypasses the auxiliary voltage source and generating a second voltage level output, applying to each of four switches arranged in an H-bridge configuration in a polarity changing module connected in series with the auxiliary voltage generation module, by the controller, a square wave modulation pulse which changes an operational status of the switch to either ON or OFF. If a first two diagonally located switches of the four switches of the H-bridge have an ON status and a second two diagonally located switches of the four switches are have an OFF status, then the second voltage level output is applied across load terminals of the H-bridge and if a second two parallel switches of the four switches both have an ON status or both have an OFF status, then the second voltage level output is not applied across the load terminals of the H-bridge.

In another exemplary embodiment, a system for voltage level generation in a switched series/parallel sources (SSPS) hybrid multilevel inverter comprises a level generation module having k voltage generation cells, a DC voltage source and 3k switches, an auxiliary module in series with the level generation module, the auxiliary module having two switches and an auxiliary DC voltage source, and a polarity changing unit in series with the level generation module and the auxiliary module, the polarity changing unit having four switches and two load terminals, and a controller having circuitry operatively connected to the switches located in the level generation module, the auxiliary module and the polarity changing unit, applying, by the controller further having program instructions stored therein that, when executed by one or more processor, cause the one or more processors to perform hybrid modulation, k square wave modulation pulses to each switch in the level generation module, and generating a first voltage level output, applying, by the controller, to each switch in the auxiliary voltage generation module including an auxiliary voltage source, a square wave modulation pulse which either places the auxiliary voltage source in series with the first voltage level output or bypasses the auxiliary voltage source and generates a second voltage level output, applying, by the controller, to each of four switches in the H-bridge configuration, a square wave modulation pulse which changes an operational status of the switch to either ON or OFF, wherein, if a first two diagonally located switches of the four switches are have an ON status and a second two diagonally located switches of the four switches are have an OFF status, then the second voltage level output is applied across load terminals of the H-bridge, wherein, if a second two parallel switches of the four switches both have an ON status or both have an OFF status, then the second voltage level output is not applied across the load terminals of the H-bridge.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
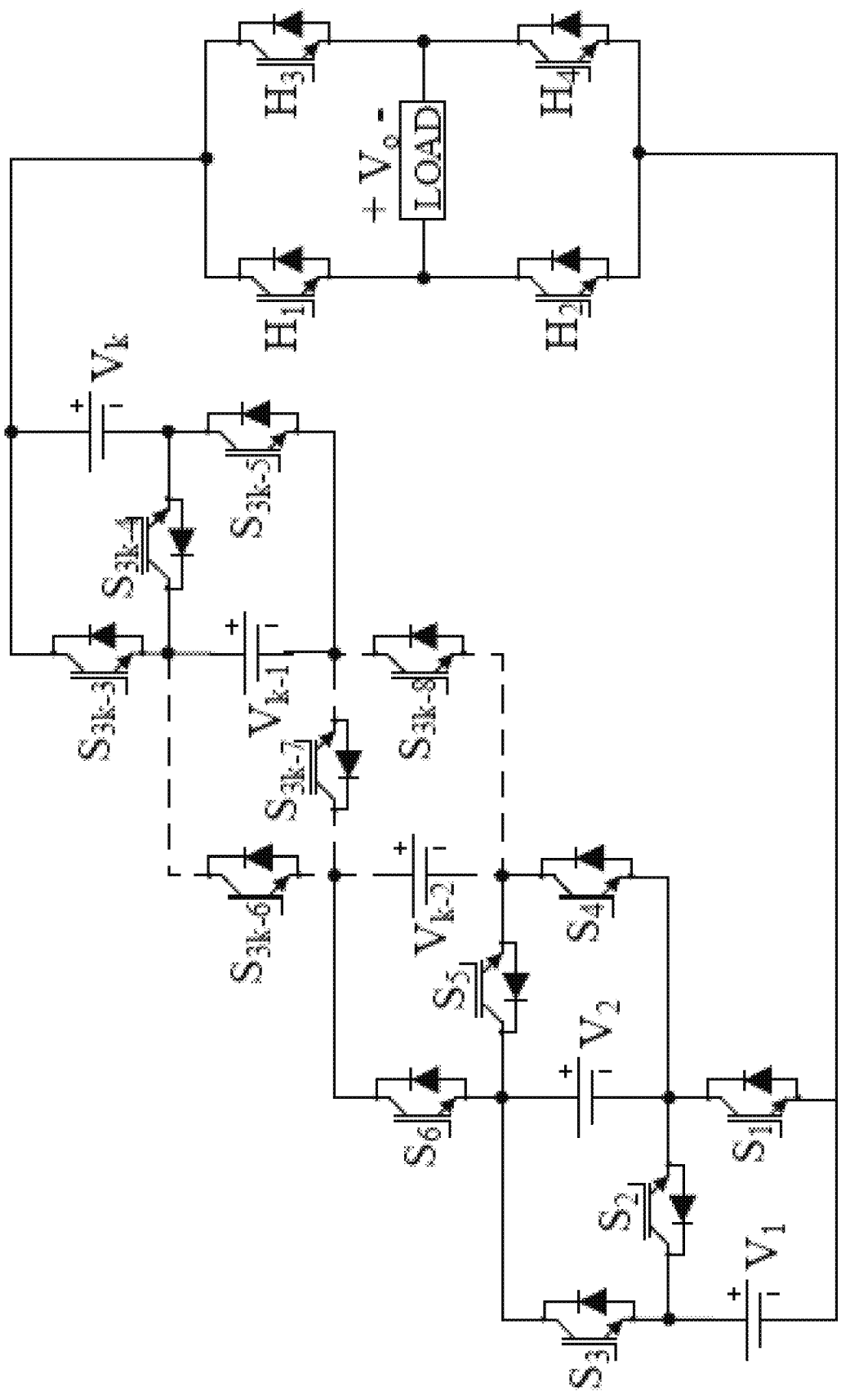
FIG. 1 illustrates a hybrid multilevel inverter.
Figure 2A:
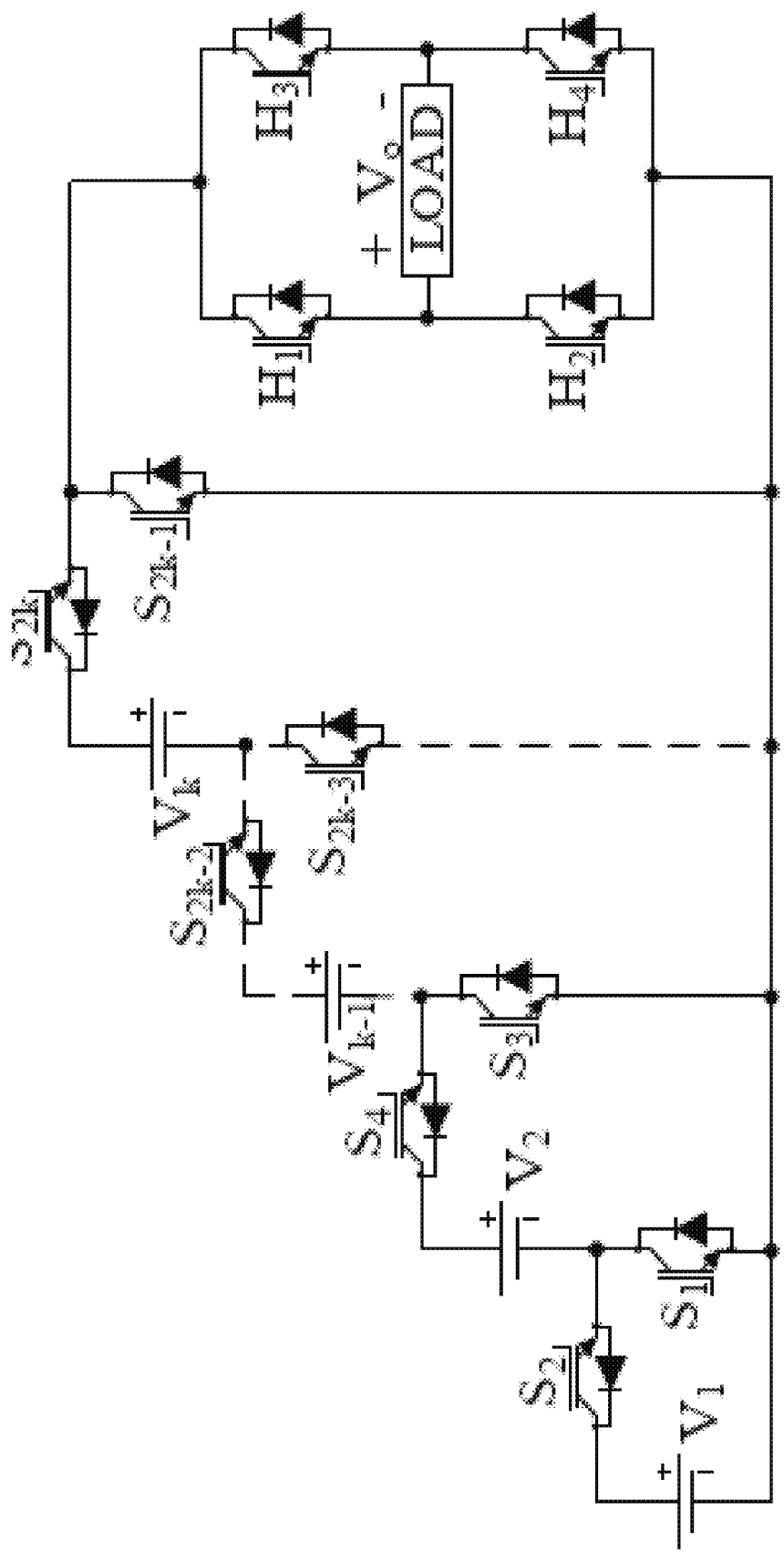
FIG. 2A illustrates a multilevel inverter topology based on series connected switched sources.
Figure 2B:
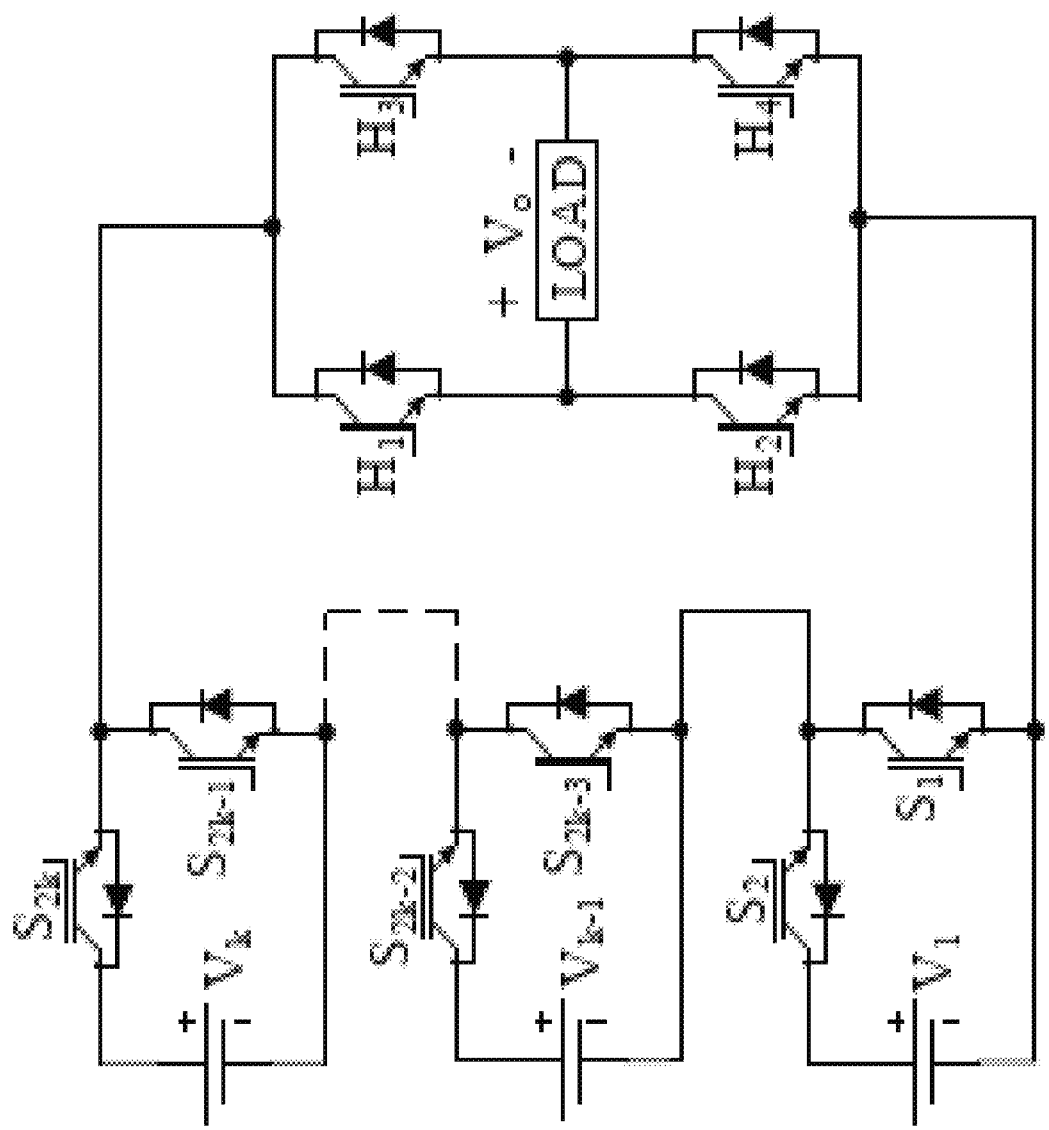
FIG. 2B illustrates a multilevel inverter topology based on a half-bridge.
Figure 3A:
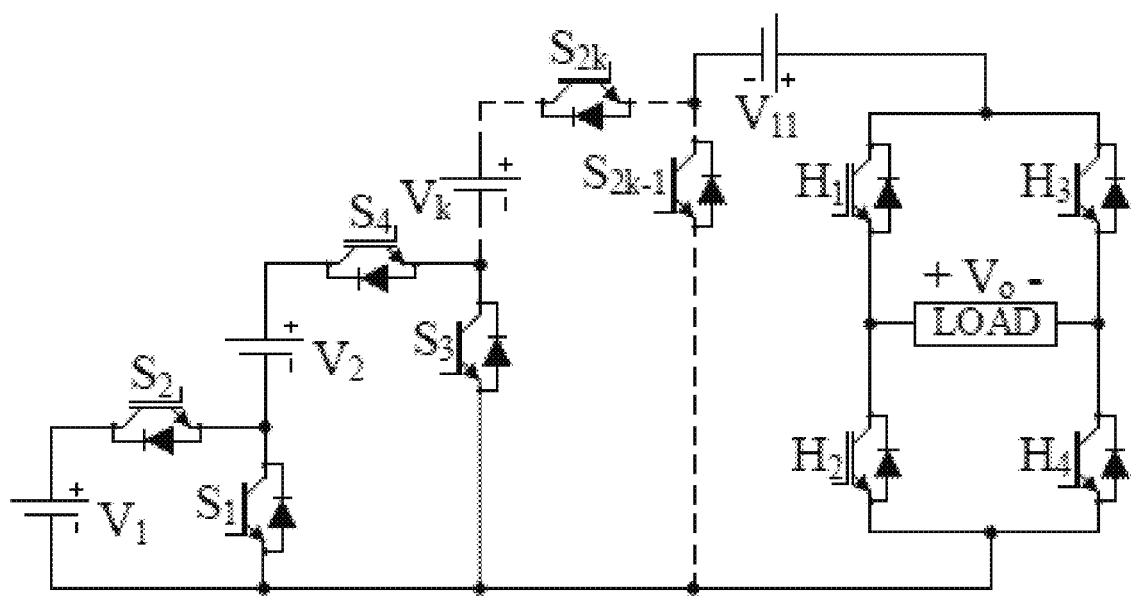
FIGS. 3A-3D illustrate hybrid multilevel inverter topologies.
Figure 3B:
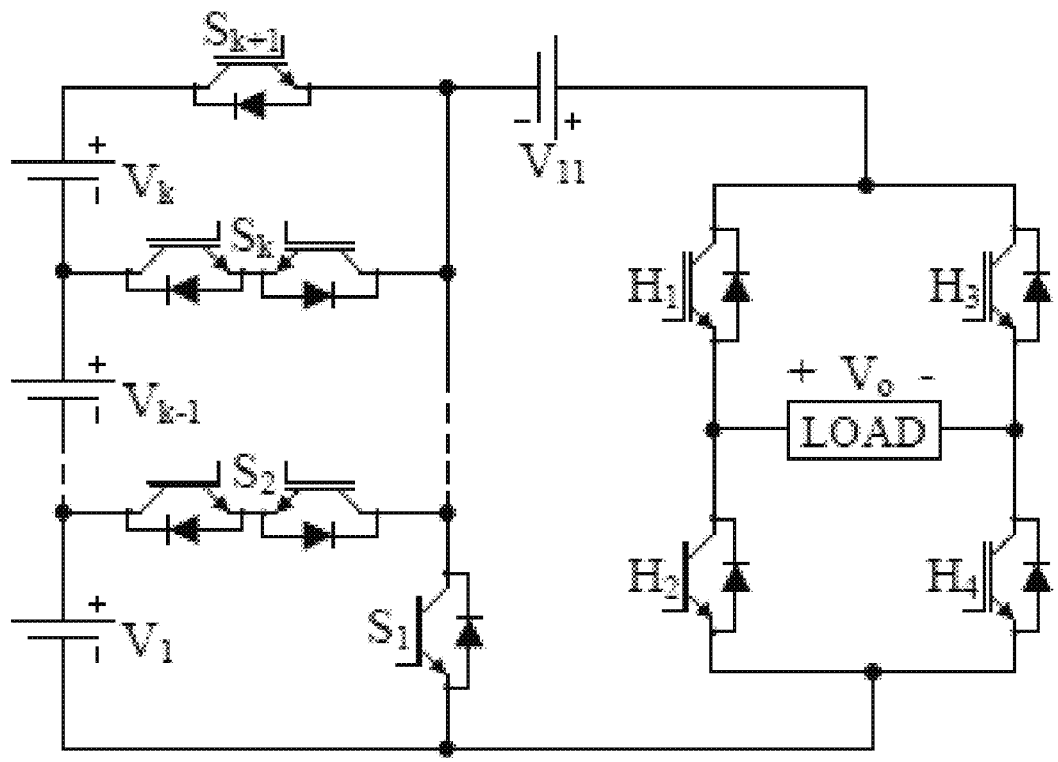
Figure 3C:
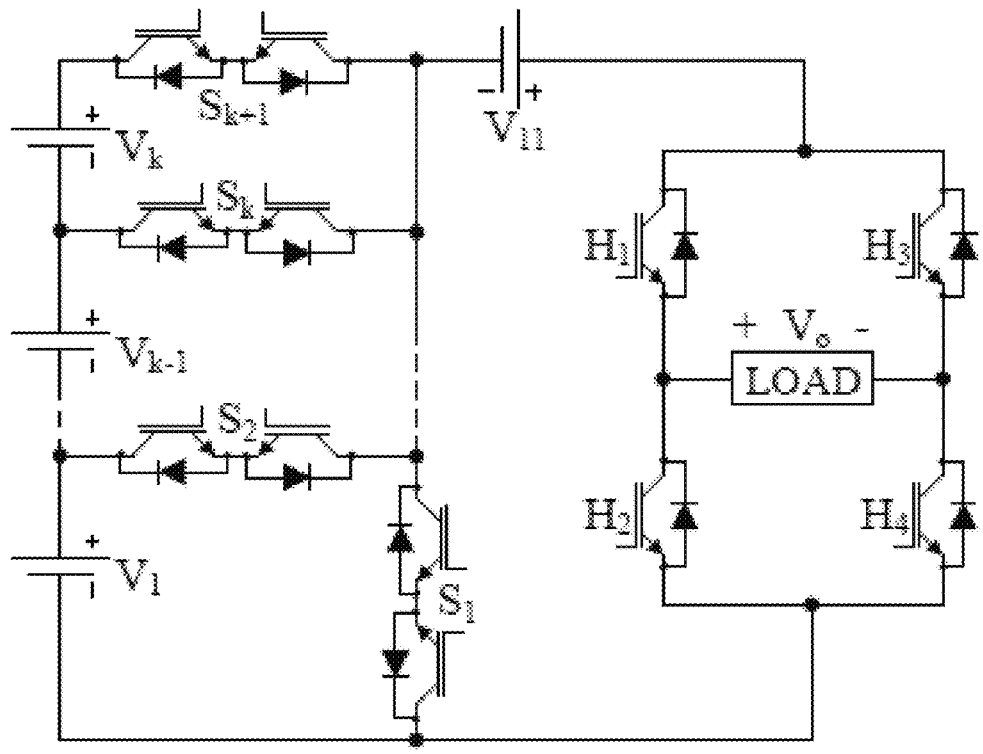
Figure 3D:
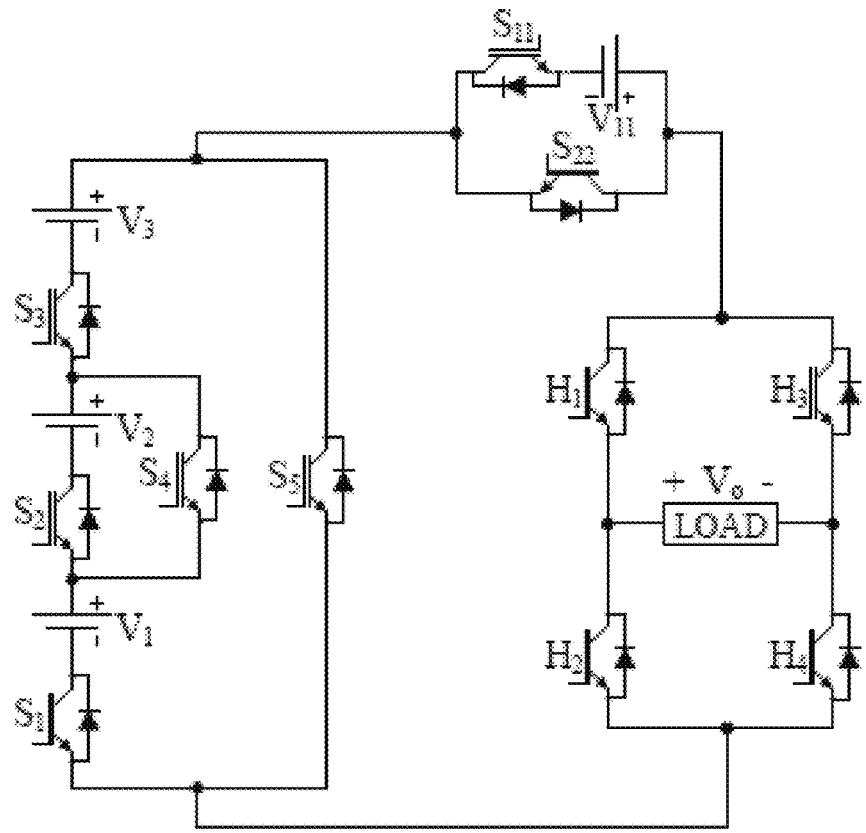

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Furthermore, the terms "approximately," "approximate," "about," and similar terms generally refer to ranges that include the identified value within a margin of 20%, 10%, or preferably 5%, and any values therebetween.

Aspects of this disclosure are directed to hybrid multilevel inverter, method for voltage level generation in a hybrid multilevel inverter and a system for voltage level generation in a hybrid multilevel inverter.

Figure 4:
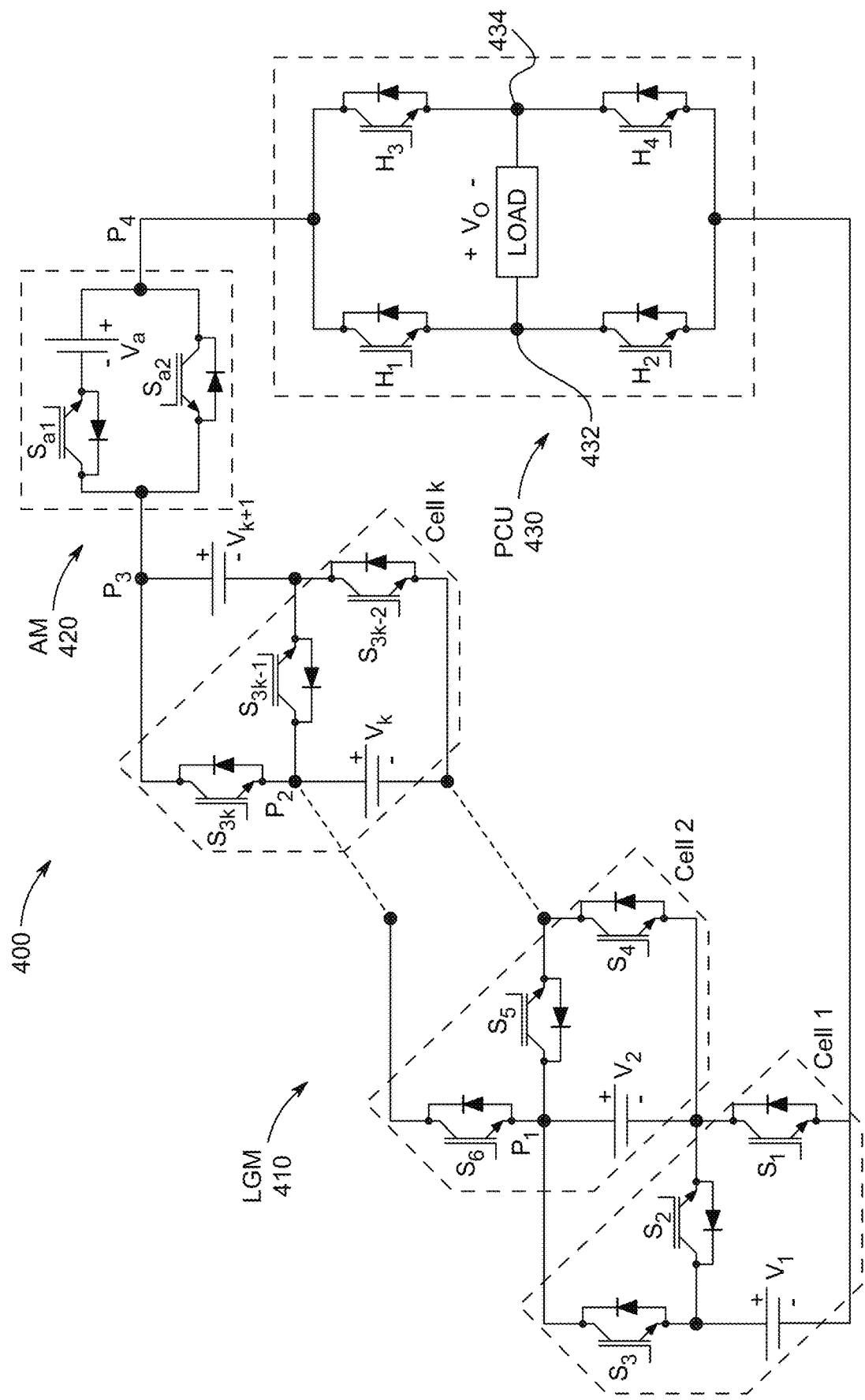
FIG. 4 illustrates a structure of the multilevel inverter topology in an embodiment of the present disclosure.

The present disclosure describes a hybrid multilevel inverter topology based on SSPS as illustrated in FIG. 4

The features and advantages of the circuit topology of the present disclosure include:
  a. Fewer switches are used to generate a higher number of levels than in conventional multilevel inverters.
  b. Parallel operation of the different DC voltage sources is utilized, thus allowing load sharing among different DC voltage sources. This results in the equal loading of stress across each DC voltage source.
  c. A higher number of levels is further achieved by incorporating an auxiliary module between the level generation and polarity changing parts.
  d. The zero voltage level is obtained by introducing a switching scheme at the polarity changing circuit.
  e. The circuit is capable of handling inductive loads.

As shown in FIG. 4, the hybrid multilevel inverter consists of three parts, i.e., a level generation module 410 (LGM), an auxiliary module 420 (AM) and a polarity changer unit 430 (PCU).

The LGM is built based on the interconnection of a k number of cells (k is an integer). Each cell comprises three unidirectional switches and one DC voltage source. For example, Cell 1 includes $S_1$, $S_2$, $S_3$ and voltage source $V_{dc1}$. The level function of the LGM is to generate the additive combinations of different DC sources of same magnitude; therefore, a staircase waveform is generated at its output $P_3$. This is done by utilizing the switches such that the voltage sources of two cells can be connected in series or parallel. For example, if switches $S_1$ and $S_3$ are turned ON, the two DC voltage sources $Vdc_1$ and $Vdc_2$ will be connected in parallel at $P_1$ and the voltage at $P_1$ is $V_{dc}$. As $V_{dc1} = V_{dc2}$, both cells share the load equally. If switch $S_2$ is turned ON and switches $S_1$ and $S_3$ are turned OFF, the two DC voltage sources $Vdc_1$ and $Vdc_2$ will be connected in series with additive polarity and $2V_{dc}$ appears at $P_1$. If switch $S_1$ is turned ON and switch $S_3$ is turned OFF or if switch $S_1$ is OFF and switch $S_3$ is ON, and $S_2$ is OFF, then there is no circuit connection and the voltage at the output of the cell is zero.

Similarly, several DC voltage sources can be operated in series and parallel combinations to share the load with different voltage levels. The pair of switches ($S_1$, $S_2$) and ($S_2$, $S_3$) should be operated in a complementary mode to avoid short-circuiting voltage source $V_{dc1}$. In other words, $S_2$ should be OFF when either $S_1$ or $S_3$ is ON and vice versa. A similar operation is required for the $k_{th}$ cell. Moreover, all switches in the LGM operate at low frequency. However, it has to be noted that the LGM cannot produce a zero level at the output because the parallel/series combination of the DC sources will always result in a certain voltage at the output (as the voltage sources cannot be set to zero and the switches themselves have small internal voltages). Since there is no instant when the output is not connected to the source, a zero level cannot exist at the output $P_3$ at any time. This module can generate all the additive combinations of the different voltage sources with their individual voltage source magnitudes. Moreover, all modules can be operated in parallel to share the load.

To generate a higher number of levels at the output $P_4$, an auxiliary module 420 (AM) is connected after the LGM 410. This module comprises one DC voltage source $V_a$ and two unidirectional switches $S_{a1}$ and $S_{a2}$. Both switches must be operated in a complementary mode to avoid short-circuiting voltage source $V_a$. When $S_{a2}$ is turned ON (and $S_{a1}$ is OFF), the voltage level generated by the LGM at $P_3$ is connected at the output $P_4$. When $S_{a1}$ is turned ON (and $S_{a2}$ is OFF), the voltage source $V_a$ adds to the level generated by the LGM at $P_3$. If the magnitude of $V_a$ is selected to be half of the DC sources, an intermediate level is formed halfway in between two levels. On the other hand, if $V_a$ equals the DC sources, no additional level is formed. Other values of $V_a$ result in an unequal intermediate step, which is not desirable. The AM is also used to construct the PWM waveform. Switches $S_{a1}$ and $S_{a2}$ are modulated similar to the conventional (two-level) inverter. Furthermore, both switches operate at a higher switching frequency as the transition for both switches occurs for each level at the output, except for the zero voltage level.

The combination of the LGM and AM generates the voltage levels in positive polarity only. To achieve both positive and negative voltage levels at the output, a standard H-bridge is used as a polarity changing unit. The H-bridge includes switches $H_1$, $H_2$, $H_3$, $H_4$ and a center connection for the load. Another function of the PCU is to generate a zero voltage level at the output. This is achieved by simultaneously holding the $H_2$ and $H_4$ ON for a certain amount of time.

Figure 5:
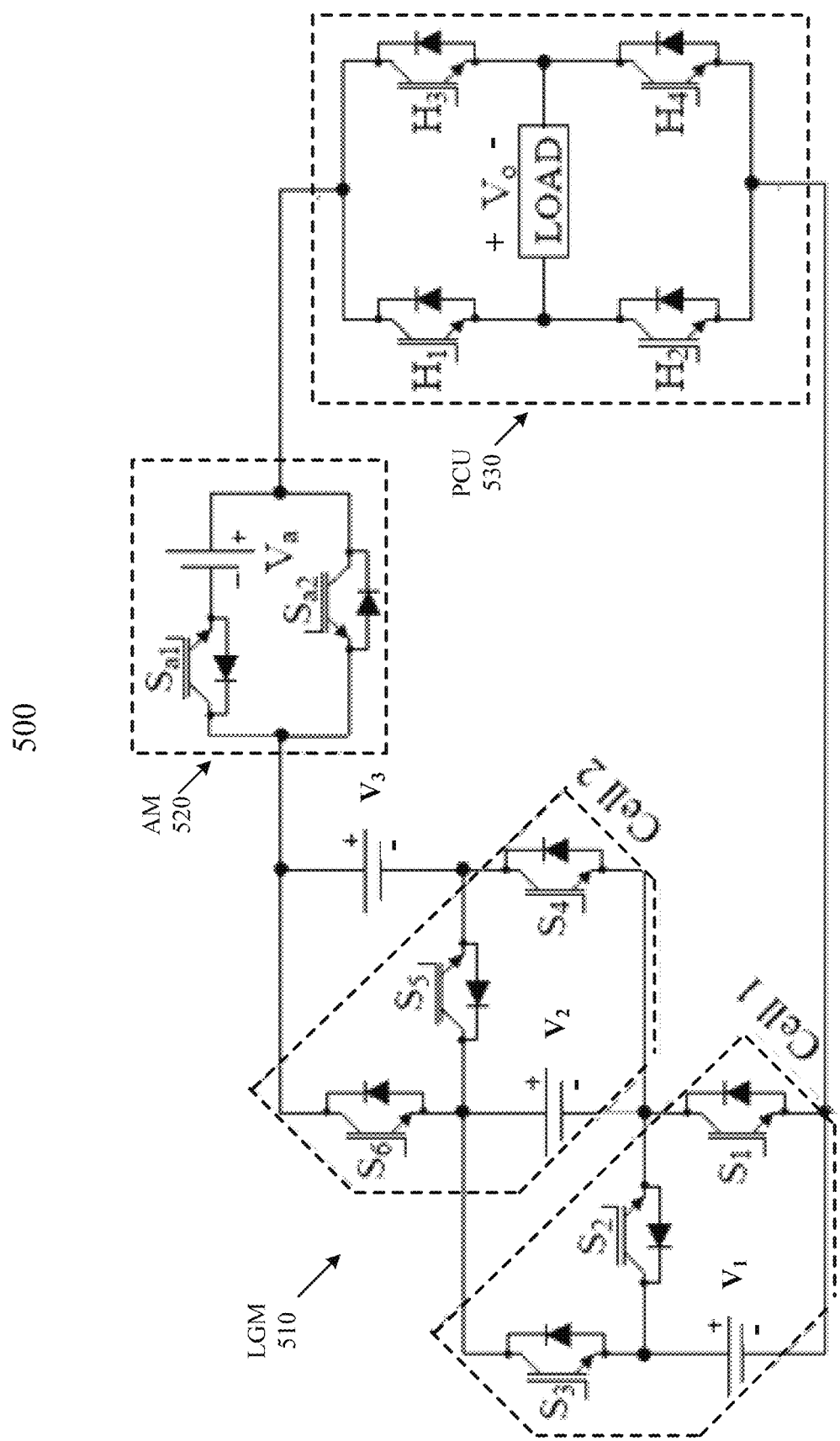
FIG. 5 illustrates the multilevel inverter topology with two cells.

The operating principle of the proposed multilevel inverter is explained with two cells (k=2) in the LGM as shown in FIG. 5. For the two cells, the topology uses 12 switches ($S_1$-$S_6$, $S_{a1}$, $S_{a2}$, $H_1$, $H_2$, $H_3$, $H_4$) and four DC sources ($V_{dc1}$, $V_{dc2}$, $V_{dc3}$, $V_a$). In order to achieve parallel operation of different DC voltage sources connected to the LGM, the magnitudes of $V_1$, $V_2$, and $V_3$ must be equal. Furthermore, the pair of switches of each cell should operate in a complementary mode to avoid short-circuiting of the DC sources. The switch pairs of the cell include ($S_1$, $S_2$) and ($S_2$, $S_3$). The switching sequences of the parallel operation and complementary pairs are given in Table 1.

TABLE 1

Switching table with two cells

| $S_1/S_3$ | $S_2$ | $S_4/S_6$ | $S_5$ | $S_{a1}$ | $S_{a2}$ | $H_1$ | $H_2$ | $H_3$ | $H_4$ | $V_o$ |
|---|---|---|---|---|---|---|---|---|---|---|
| 0 | 0 | 0 | 0 | 0 | 0 | 0 | 1 | 0 | 1 | 0 |
| 1 | 0 | 1 | 0 | 0 | 1 | 1 | 0 | 0 | 1 | $V_{dc}$ |
| 1 | 0 | 1 | 0 | 1 | 0 | 1 | 0 | 0 | 1 | $V_{dc} + V_a$ |
| 0 | 1 | 1 | 0 | 0 | 1 | 1 | 0 | 0 | 1 | $2V_{dc}$ |
| 0 | 1 | 1 | 0 | 1 | 0 | 1 | 0 | 0 | 1 | $2V_{dc} + V_a$ |
| 0 | 1 | 0 | 1 | 0 | 1 | 1 | 0 | 0 | 1 | $3V_{dc}$ |
| 0 | 1 | 0 | 1 | 1 | 0 | 1 | 0 | 0 | 1 | $3V_{dc} + V_a$ |
| 0 | 0 | 0 | 0 | 0 | 0 | 1 | 0 | 1 | 0 | 0 |
| 1 | 0 | 1 | 0 | 0 | 1 | 0 | 1 | 1 | 0 | $-V_{dc}$ |
| 1 | 0 | 1 | 0 | 1 | 0 | 0 | 1 | 1 | 0 | $-(V_{dc} + V_a)$ |
| 0 | 1 | 1 | 0 | 0 | 1 | 0 | 1 | 1 | 0 | $-2V_{dc}$ |
| 0 | 1 | 1 | 0 | 1 | 0 | 0 | 1 | 1 | 0 | $-(2V_{dc} + V_a)$ |
| 0 | 1 | 0 | 1 | 0 | 1 | 0 | 1 | 1 | 0 | $-3V_{dc}$ |
| 0 | 1 | 0 | 1 | 1 | 0 | 0 | 1 | 1 | 0 | $-(3V_{dc} + V_a)$ |

The number of levels at the output is decided by the magnitude of DC voltage sources connected in the LGM 510 and AM 530. For the parallel operation of the multilevel inverter, the magnitude of DC sources connected in LGM must be the same. If the magnitude is not equal, the anti-parallel diode connected to an IGBT will conduct, which leads to the short-circuiting of the voltage sources.

The multilevel inverter can operate in two modes. The magnitude of voltage source $V_a$ of the AM 520 determines these modes.

Mode I may be viewed as a symmetrical configuration. In this mode, the magnitude of each DC source, including the DC source in the AM, is selected as $V_{dc}$. Therefore, $$V_1 = V_2 = \ldots = V_{k+1} = V_{a1} = V_{dc} \quad (1)$$

where k is preferably in the range of 1 to 100, more preferably in the range of 1-75, even more preferably in the range of 1-50, most preferably in the range of 20-50.

Therefore, the number of levels (N) across the load in Mode I operation with a k number of cells in the LGM is given as:

$$N_{levels} = 2(k+1) \quad (2)$$

Mode II: a higher number of levels can be realized at the output by changing the magnitude of $V_a$ (inside the AM) to $V_{dc}/2$. The DC sources connected in the LGM remain as before, i.e., each voltage source has a magnitude of $V_{dc}$. Therefore the magnitude of voltage sources connected in the LGM is modified as $V_1 = V_2 = \ldots = V_{k+1} = 2V_{dc}$. Using these DC voltages, the number of levels increases to $$N_{levels} = 4(k+1) \quad (3)$$

and, if the zero level generator is activated, N increases by one more step, i.e., $$N_{levels} = 4(k+1) + 1 \quad (4)$$

The number of switches used in the topology is given by $$N_{IGBT} = N_{Driver} = 3(k+2) \quad (5)$$

Since all switches are unidirectional, $N_{IGBT}$ driver circuits are required to activate the switches.

From eq. (3)-(5), the number of switches can be related to the number of levels in Mode I as follows:

$$N_{IGBT} = N_{Driver} = \tfrac{3}{2}(N-1) \quad (6)$$

$$N_{sources} = \tfrac{1}{2}(N-1) \quad (7)$$

where $N_{sources}$ is the number of all DC voltage sources connected in circuit topology.

Similarly, for Mode II, $$N_{IGBT} = N_{Driver} = \tfrac{3}{4}(N-3) \quad (8)$$

$$N_{sources} = \tfrac{1}{2}(N+3) \quad (9)$$

The voltage stresses across the switches play an important role in the selection of the power devices. Total standing voltage (TSV) is defined as the sum of maximum voltage stress across all power semiconductor devices considering all voltage levels. The TSV of the topology can be written as:

$$TSV = TSV_{LGM} + TSV_{AM} + TSV_{PCU} \quad (10)$$

where $TSV_{LGM}$, $TSV_{AM}$ and $TSV_{PCU}$ represent the TSV of the LGM, AM, and PCU, respectively.

The maximum voltage stress across each switch connected in the LGM is equal to the magnitude of voltage sources. Therefore:

$$TSV_{LGM} = 3 \times k \times V_{dc} \text{ for Modes I and II} \quad (11)$$

The voltage stresses across $S_{a1}$ and $S_{a2}$ are fixed by the magnitude of voltage source $V_a$. Therefore:

$$TSV_{AM} = 2 \times V_{dc} \text{ for Mode I} \quad (12)$$

$$TSV_{AM} = 2 \times 0.5 V_{dc} \text{ for Mode II} \quad (13)$$

The maximum voltage stress across switches connected in the PCU is the sum of all the DC voltage sources connected in the topology. Hence, the TSV of PCU is given by $$TSV_{PCU} = 4(k+2) \times V_{dc} \text{ for Mode I} \quad (14)$$

$$TSV_{PCU} = 4(k+1.5) \times V_{dc} \text{ for Mode II} \quad (15)$$

The TSV of the overall topology is calculated by adding the TSV of all the parts for both modes of operation. From eq. (8)-(11), $$TSV = (7k+10) \times V_{dc} \text{ for Mode I} \quad (16)$$

$$TSV = 7(k+1) \times V_{dc} \text{ for Mode II} \quad (17)$$

Hence, for Mode I, $$TSV = \tfrac{7}{2}(N+3) \times V_{dc} \quad (18)$$

and, for Mode II, $$TSV = \tfrac{7}{4} N \times V_{dc} \quad (19)$$

Figure 6A:
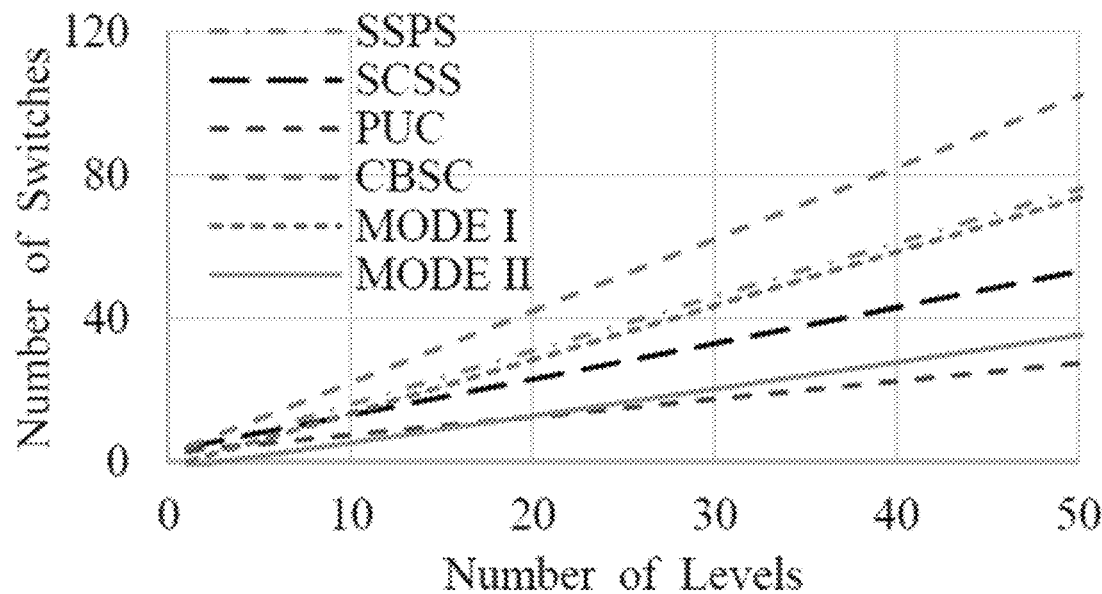
FIGS. 6A-6D illustrate the comparison of the hybrid multilevel inverter in mode I and mode II of the present disclosure with conventional inverters SSPS, SCSS, PUC, CBSC by (A) number of switches; (B) number of DC sources; (C) total standing voltage (TSV) and (D) variety of DC voltage sources with respect to the number of levels.
Figure 6B:
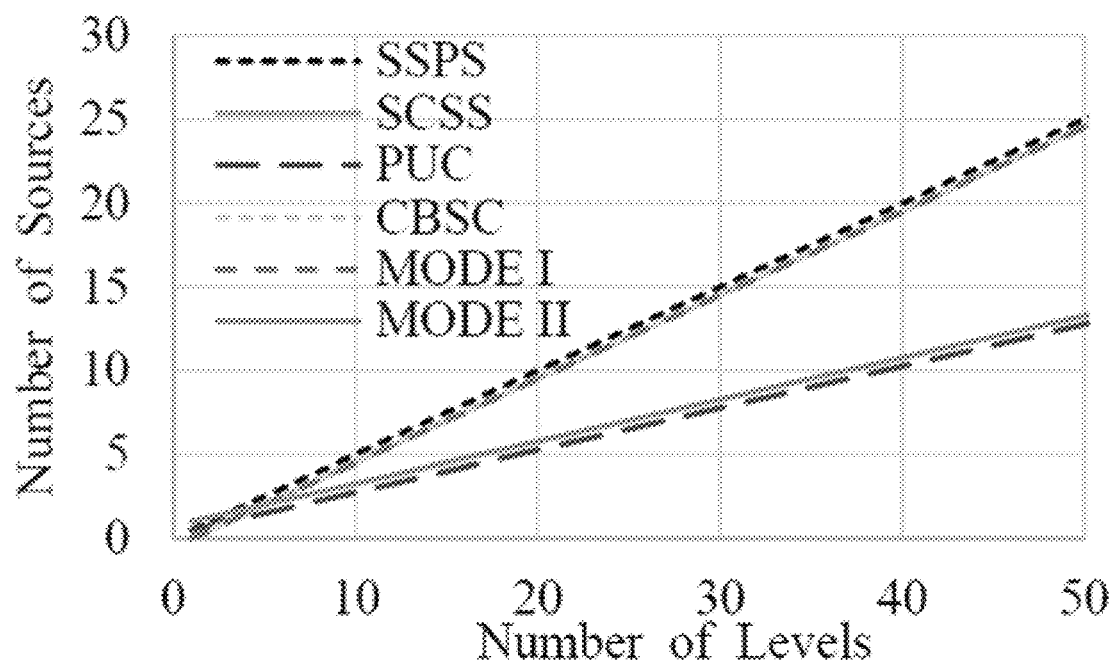
Figure 6C:
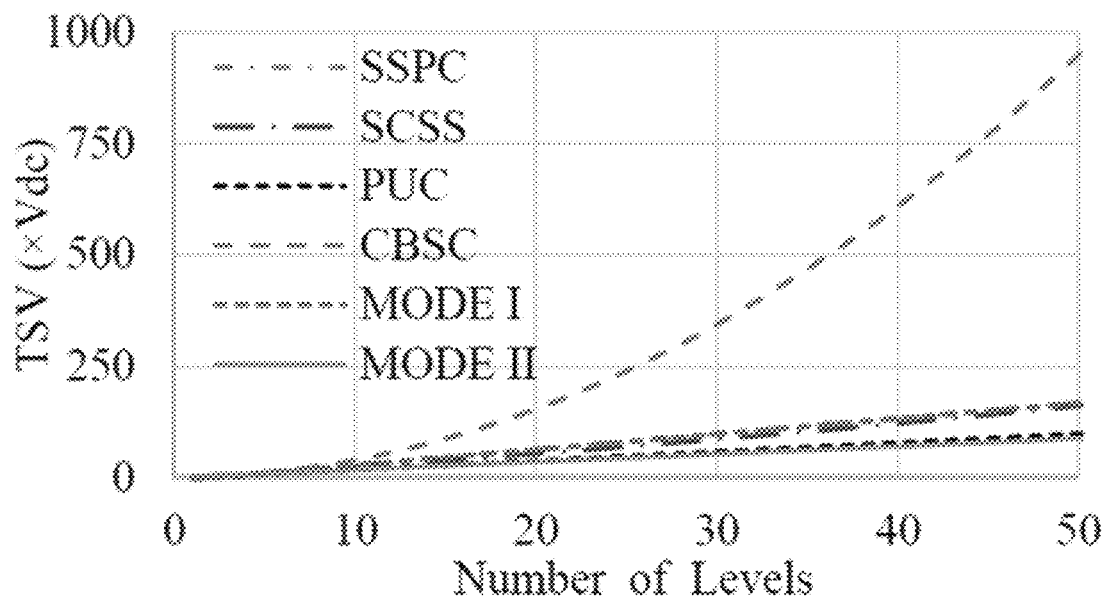
Figure 6D:
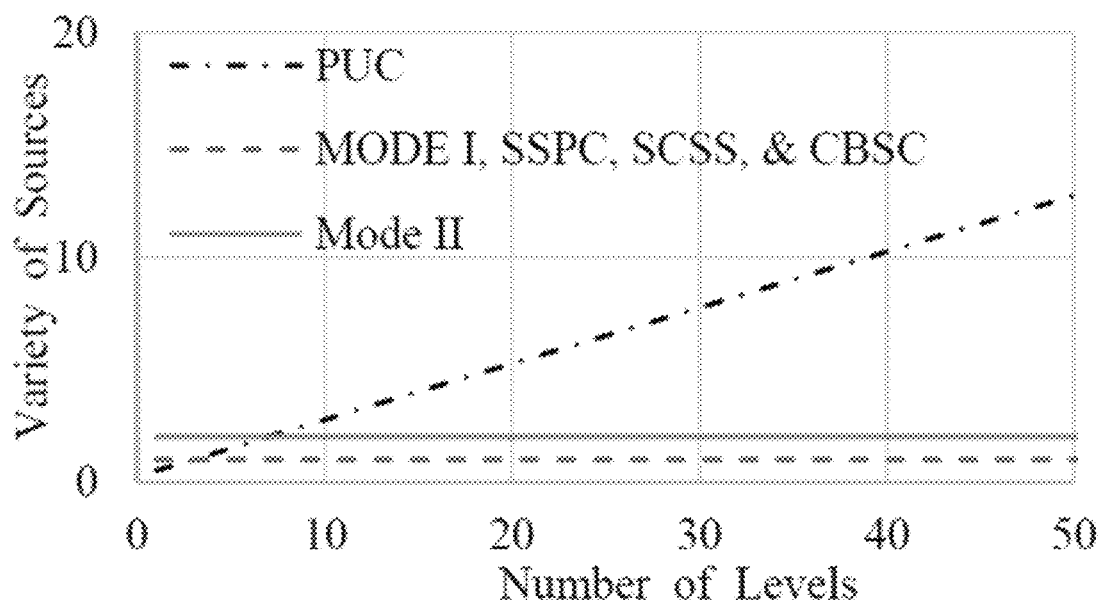

A comparison against conventional multilevel inverters was made regarding the number of switches, number of DC voltage sources, TSV and the variety of DC voltage sources in terms of number of levels. Four similar topologies, i.e., the SSPC, SCSS, PUC and CBSC multilevel inverters, were considered. FIG. 6A shows the comparison of the number of switches with respect to the number of levels at the output. From FIG. 6A, it is clear that the topology of Mode II requires the least number of switches (for up to 20 levels) compared to other topologies. Furthermore, the topology in Mode I requires fewer switches than CBSC and SSPS topologies. A goal of the present disclosure is to generate a high number of levels using a lower number of voltage sources. FIG. 6B compares the number of DC voltage sources against the number of levels. The topology in Mode II requires a lower number of DC voltage sources, except for PUC. FIG. 6C displays the comparison of the TSV with respect to the number of levels. When operated in Mode II, the topology has lower TSV than PUC, CBSC and SCSS multilevel inverters. In addition, FIG. 6D shows the variation of DC voltage sources required for number of levels at the output. The topology in Mode I requires one variety of the DC voltage source (i.e., one value for all DC sources). In Mode II, two varieties are required because the $V_{a2}$ is set to half of $V_{dc}$. This is much lower than the variety of DC voltage sources required for the PUC multilevel inverter. Overall, the reduced number of switches and DC voltage sources along with lower TSV are the main advantages of the multilevel inverter of the present disclosure.

Figure 7A:
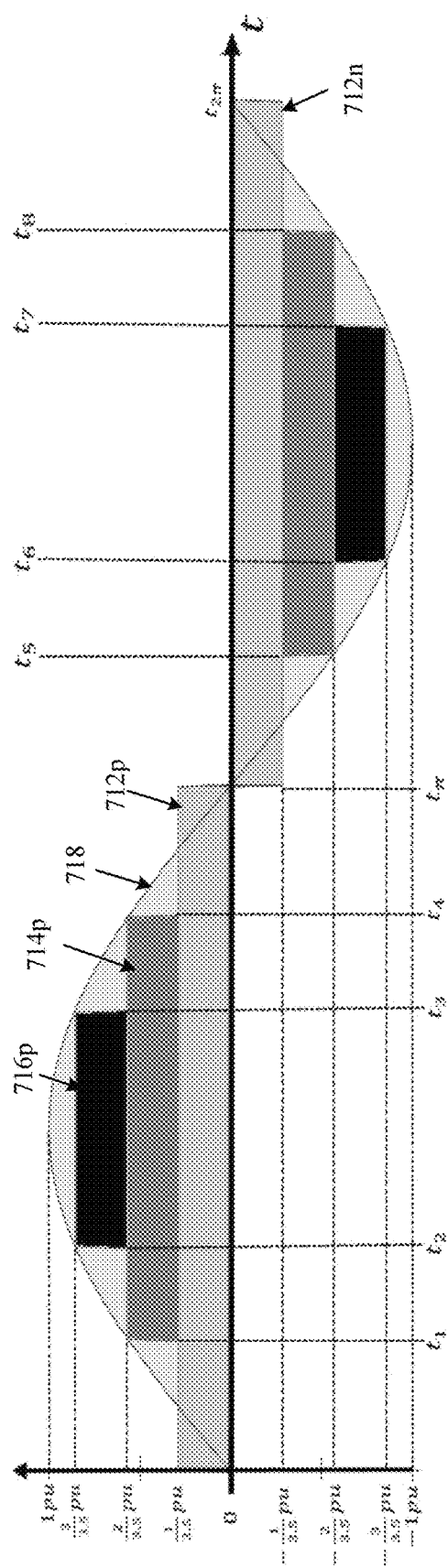
FIGS. 7A-7B illustrate (A) the hybrid modulation technique and (B) differentiated gate signals with carrier signals.

In the present disclosure, a hybrid modulation technique is utilized for the switches. (See Hinago et al.; and Bassi, H. M. "Floating source multilevel inverter uses hybrid double switching frequencies". In Proceedings of the 2017 52nd International Universities Power Engineering Conference (UPEC), Heraklion, Greece, 28-31 Aug. 2017; pp. 1-5 and Hinago, Y., Koizumi, H.: "A single-phase multilevel inverter using switched series/parallel DC voltage sources", IEEE Trans. Ind. Electron., 2010,57, (8), pp. 2643-2650, both incorporated herein by reference in their entirety). To illustrate the hybrid modulation technique, a six-level multilevel inverter is used. The modulation is divided into two parts. First, the large pulses drive the LGM switches. This is shown in FIG. 7A. It comprises three square waves (k=3), each having a peak magnitude of $$\left(\frac{1}{3.5}\right) pu$$

in the positive halt cycle. Preferably each switch receives the three square waves. The negative portion has a magnitude $$\left(\frac{1}{-3.5}\right) pu.$$

These square waves are used to establish the essential part of the sinusoidal reference signal 718 in the positive and negative half cycles. For the positive half cycle, the lower square wave 712p is placed between 0 and $t_\pi$. In the negative half cycle, the corresponding negative square wave 712n is located between $t_\pi$ and $t_{2\pi}$. In FIG. 7A, the AM circuit is meant to modulate the area under the curve 718. Therefore, the control circuit subtracts the sinusoidal reference wave 718 from the black and grey blocks 712,714 and 716. The comparison of the lower square wave and sinusoidal reference signal gives the gate pulses for switches $S_1$ and $S_2$ of the LGM. In the same way, the comparison of other square waves generates the gate pulses for other LGM switches. The result of this subtraction can be shown in FIG. 7B as the curve 719 that ranges from −1.14 to 1.14. This curve is modulated with two carriers, 713 and 715.

Figure 7B:
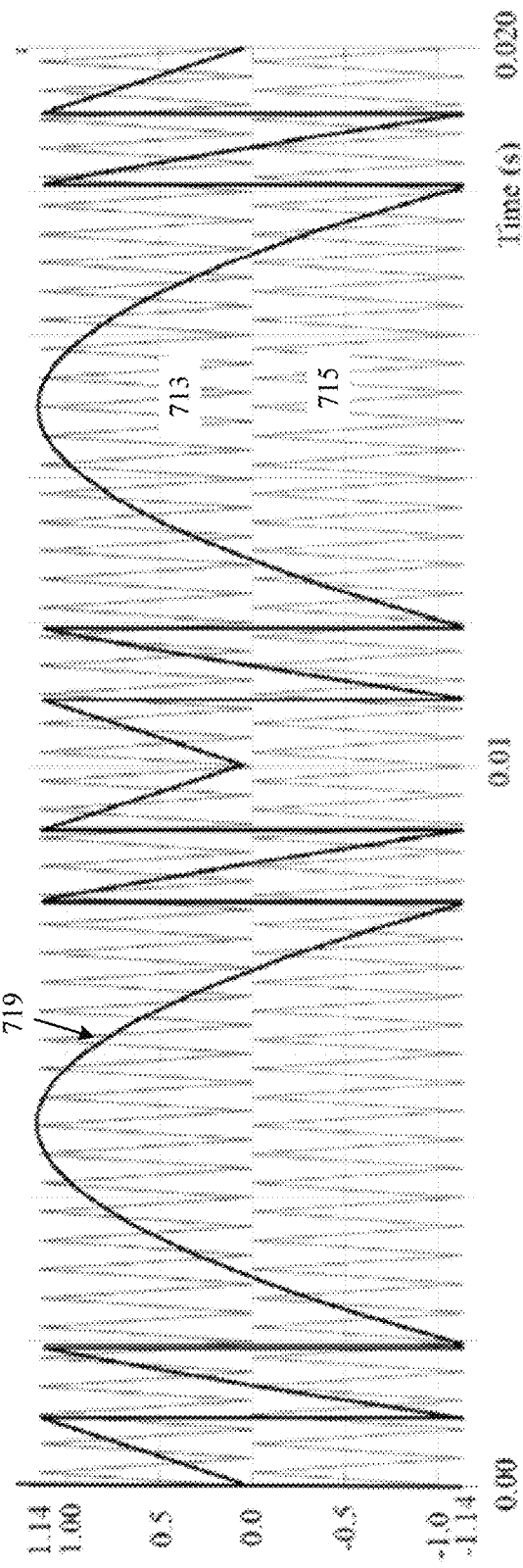

For the generation of the gate pulses of the AM, a differentiated reference signal is created as shown in FIG. 7B. The differentiated reference single is created by locating the area which is not common between sinusoidal reference single and square waves. Each such portion of the sinusoidal signal is placed between $$\frac{1}{3.5} pu \text{ and } \frac{1}{-3.5} pu.$$

This differentiated reference signal is then compared with a carrier signal to generate gate pulses for switches of AM.

Figure 8A:
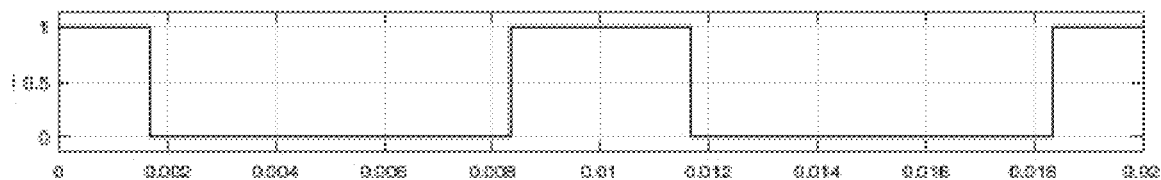
FIGS. 8A-8H illustrate (A) gate pulses for $S_1$ (LGM); (B) gate pulses for $S_2$ (LGM); (C) gate pulses for $S_4$ (LGM); (D) gate pulses for $S_5$ (LGM); (E) gate pulses for $S_{a1}$ (AM); (F) gate pulses for $S_{a2}$ (AM); (G) gate pulses for $H_1$ (PCU); and (H) gate pulses for $H_3$ (PCU)
Figure 8B:
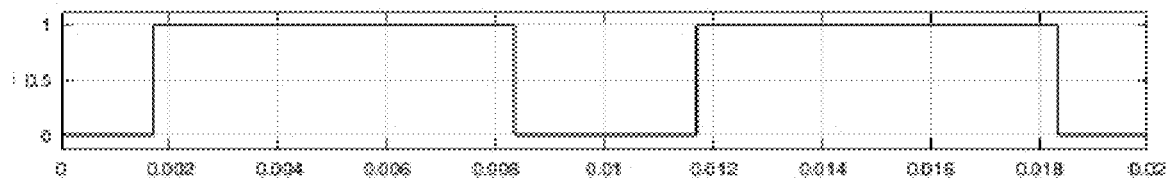
Figure 8C:
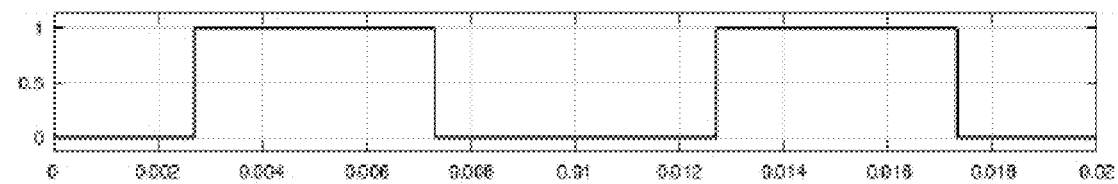
Figure 8D:
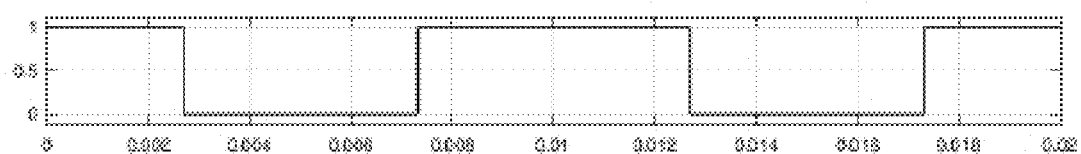
Figure 8E:
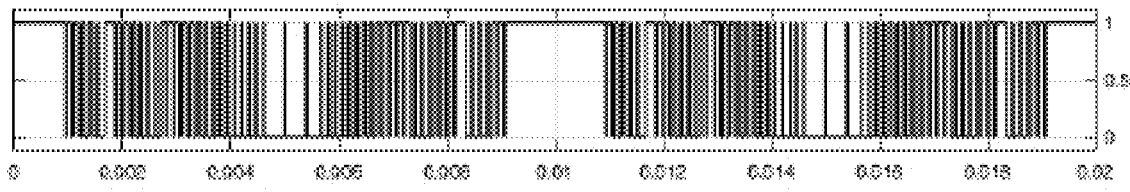
Figure 8F:
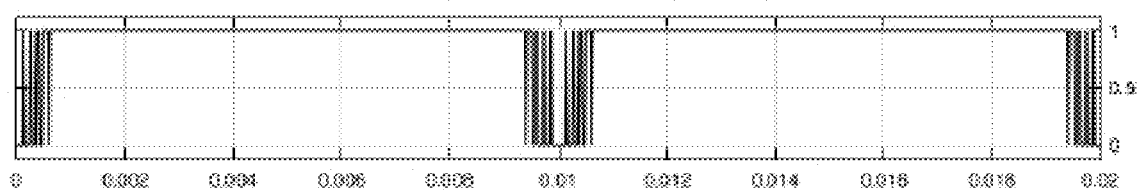
Figure 8G:
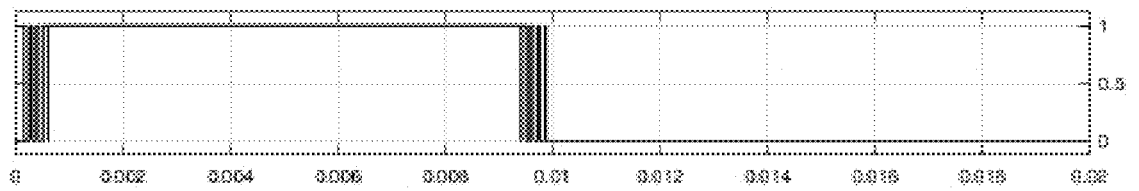
Figure 8H:
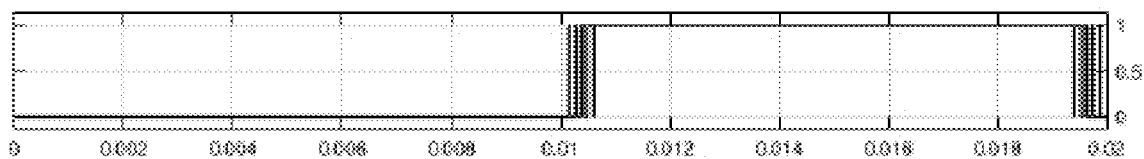

The overall gate signals generated from this modulation scheme are summarized in FIG. 8A-8H. These signal labels are consistent with the circuit shown in FIG. 5. FIG. 8A represents the gate pulses for $S_1$ (LGM), FIG. 8B represents the gate pulses for $S_2$ (LGM), FIG. 8C represents the gate pulses for $S_4$, (LGM), FIG. 8D represents the gate pulses for $S_5$ (LGM), FIG. 8E represents the gate pulses for $S_{a1}$ (AM), FIG. 8F represents the gate pulses for $S_{a2}$ (AM), FIG. 8G represents the gate pulses for $H_1$ (PCU), and FIG. 8H represents the gate pulses for $H_3$ (PCU).

The performance of multilevel inverter and its modulation strategy was simulated by PSCAD software. Two cells were used (i.e., k=2) for the simulation results in Mode II. Therefore, three DC voltage sources were connected to the LGM each having a magnitude of 30 V. Both modes (Modes I and II) are simulated at a modulation index of 1.14. Up to 13 levels are generated at the output. For Mode I, $V_a=V_{dc}=30$ V, while for Mode II, it is half of $V_{dc}$, i.e., 15 V. The simulation is performed with a carrier frequency of 7.5 kHz. The square wave pulses for the LGM and PWM for the AM are generated using the modulation technique described above. For convenience, the simulation is done under a no-load condition in order to emphasize the correctness of the generated waveforms. The performance with load (R and RL) is described with respect to the experimental results presented below.

Figure 9A:
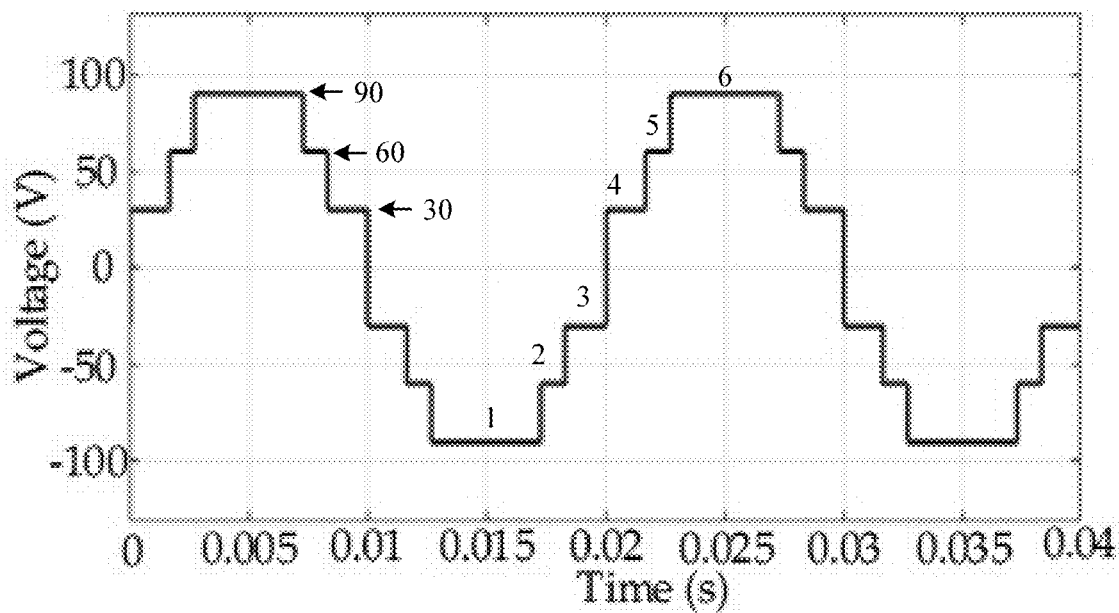
FIGS. 9A-9B illustrate the output of the hybrid multilevel inverter in Mode I under no-load condition (A) voltage waveform (B) corresponding harmonics spectra with total harmonic distortion of 15.5%.
Figure 9B:
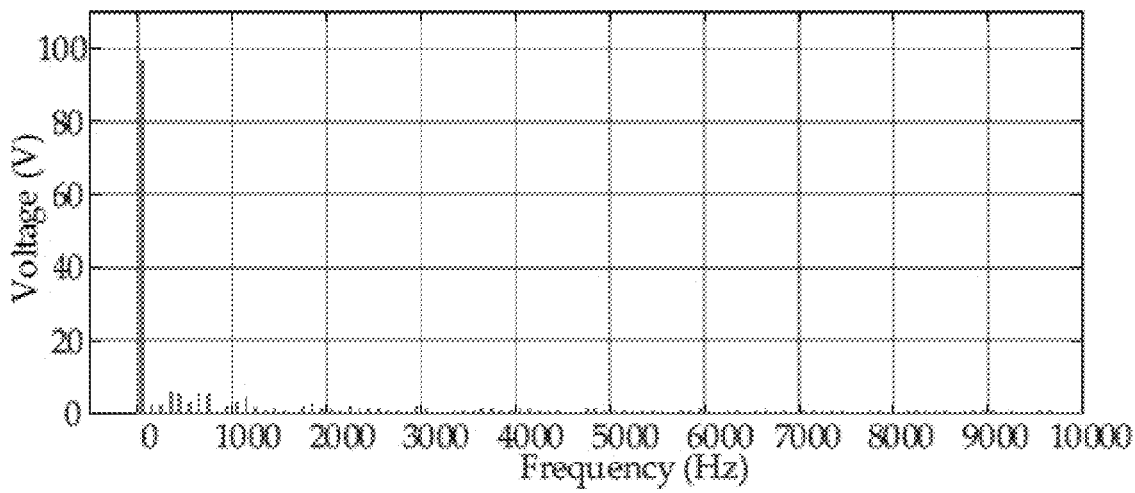

The output voltage of the multilevel inverter in Mode I is shown in FIG. 9A. As expected, the output voltage waveform is of the staircase type as the switches of LGM operate at the fundamental frequency. As can be observed from FIG. 9A, the number of levels is 6, which is consistent with Equation (2). Since the DC source is 30 V, the generated levels are 30, 60 and 90 V. Furthermore, the output voltage does not have a zero level, which is inherent to the topology when operated in Mode I. FIG. 9B shows the harmonics spectrum of the FFT without filtering. The computed total harmonic distortion is 15.5%.

Figure 10A:
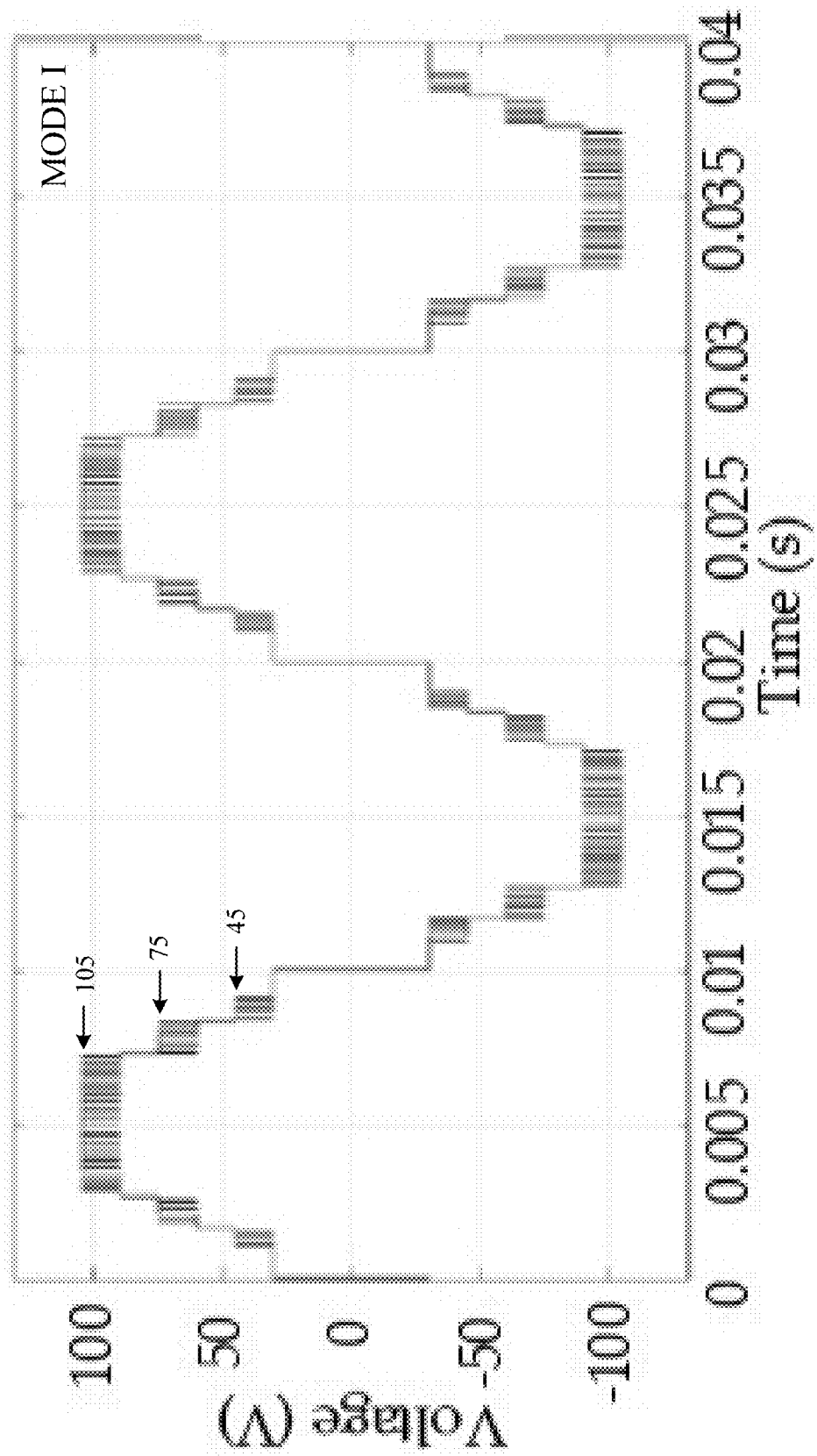
FIGS. 10A-10B illustrate the output of the hybrid multilevel inverter in Mode II without the introduction of the zero level (A) voltage waveform (B) its corresponding harmonics spectra with total harmonic distortion of 12.5%.
Figure 10B:
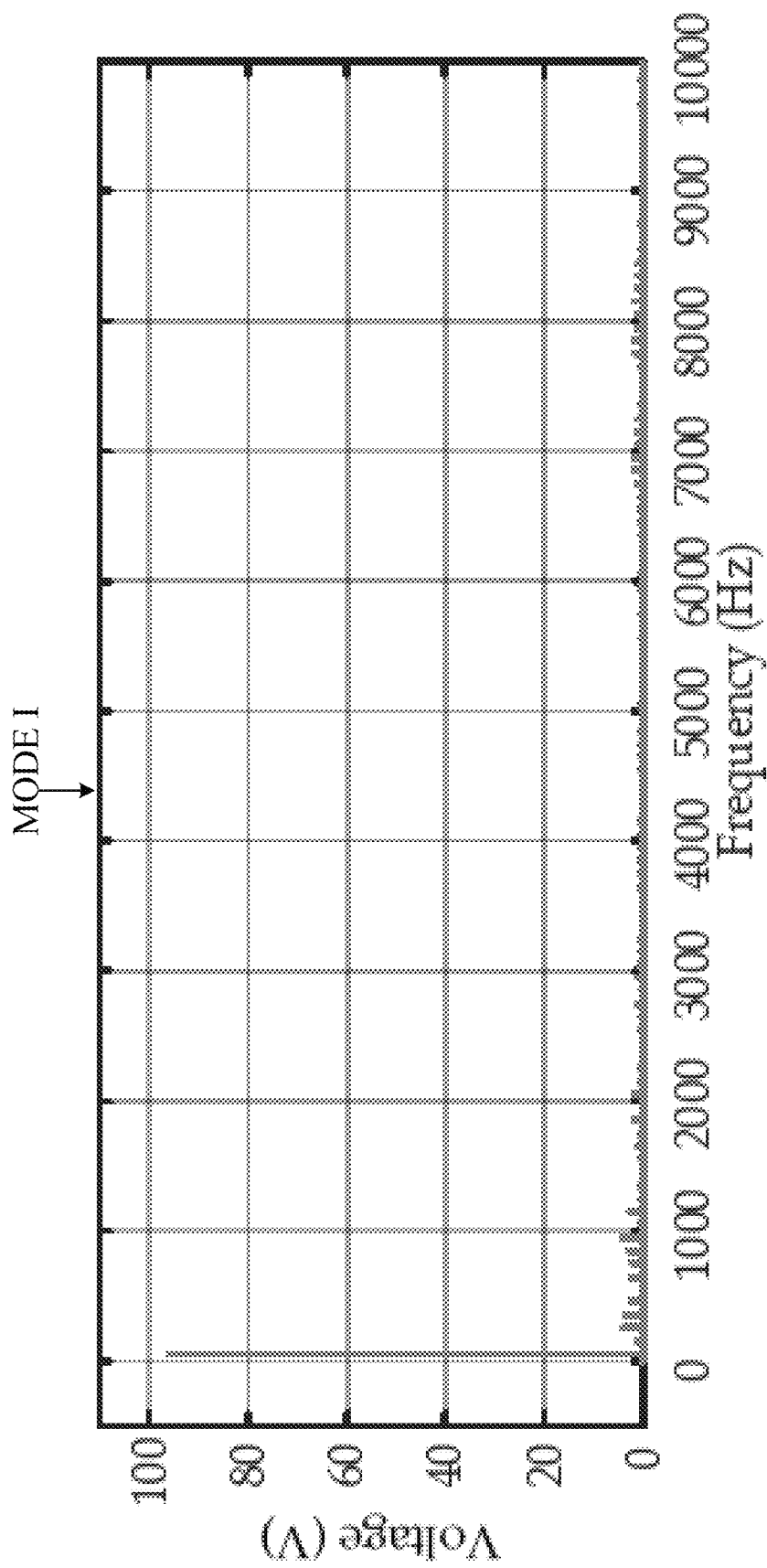
Figure 11A:
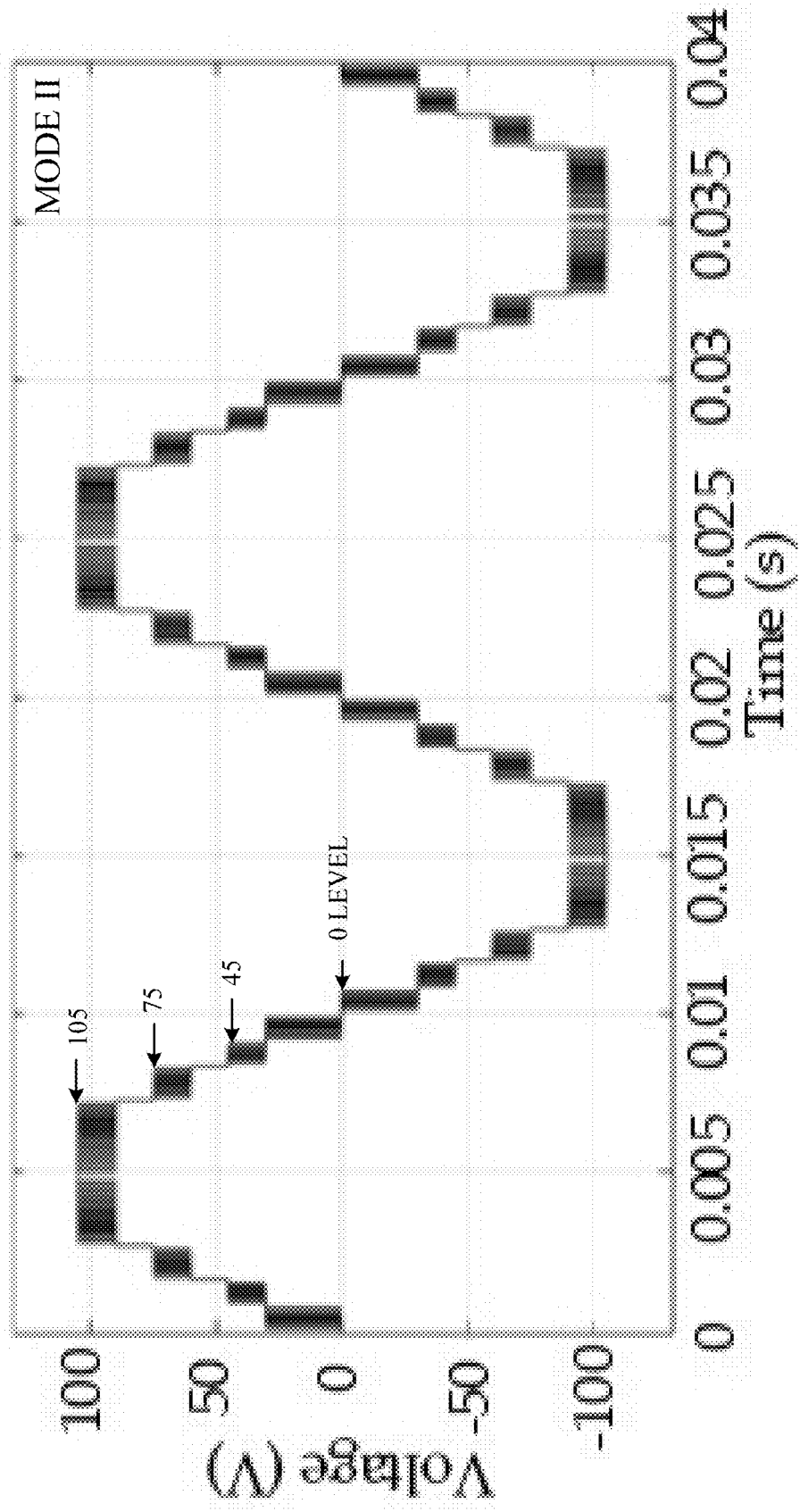
FIGS. 11A-11H illustrate the output of the hybrid multilevel inverter in Mode II with the introduction of the zero level (A) voltage waveform (B) its corresponding harmonics spectra with total harmonic distortion of 9.5% (C) simulated Mode II (D) FFT of the voltage of (C) (E) voltage stress across switch $S_1$ (F) voltage stress across switch $S_2$ (G) voltage stress across switch $S_3$ (H) voltage stress across switch $S_4$.
Figure 11B:
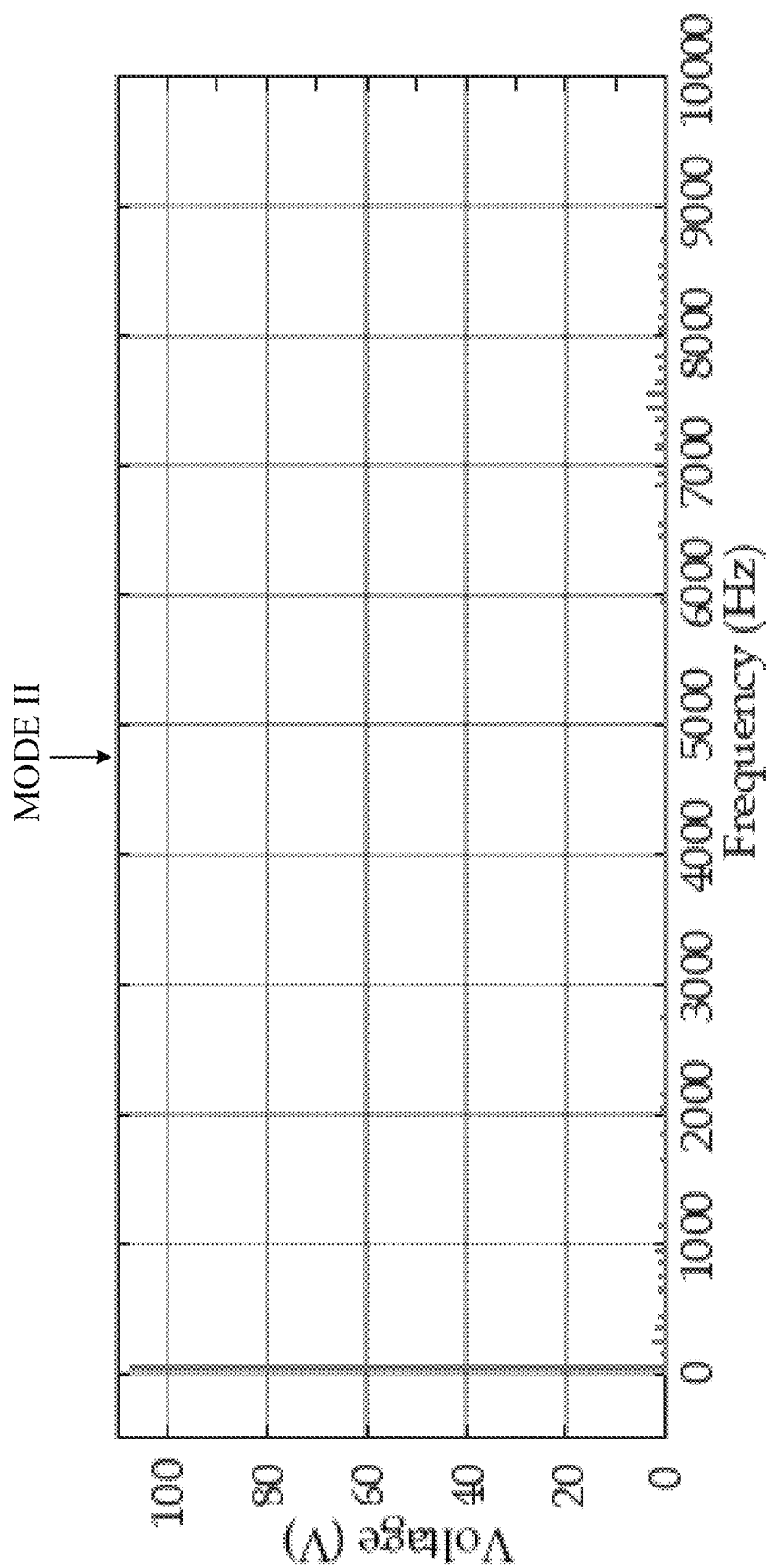

When the AM is enabled, i.e., Mode II, additional levels are created. This is shown in FIG. 10A. According to Equation (3), the number of levels is increased to twelve. Since $V_a=0.5$ $V_{dc}$, the new levels are located at 45, 75 and 105 V. Furthermore, since the zero level generators are not activated, this level is absent from the waveform of FIG. 10A. Mode II with the zero level is shown in FIG. 11A. FIGS. 10B and 11B show the harmonic spectrum with (FIG. 10B) and without the zero voltage level generation (FIG. 11B), respectively. The total harmonic distortion of the harmonic spectrum shown in FIG. 10B is 12.5%. With the introduction of the zero level, the total harmonic distortion is reduced to 9.5% as shown in FIG. 11B. Note that these are total harmonic distortion values are without filtering.

Figure 11C:
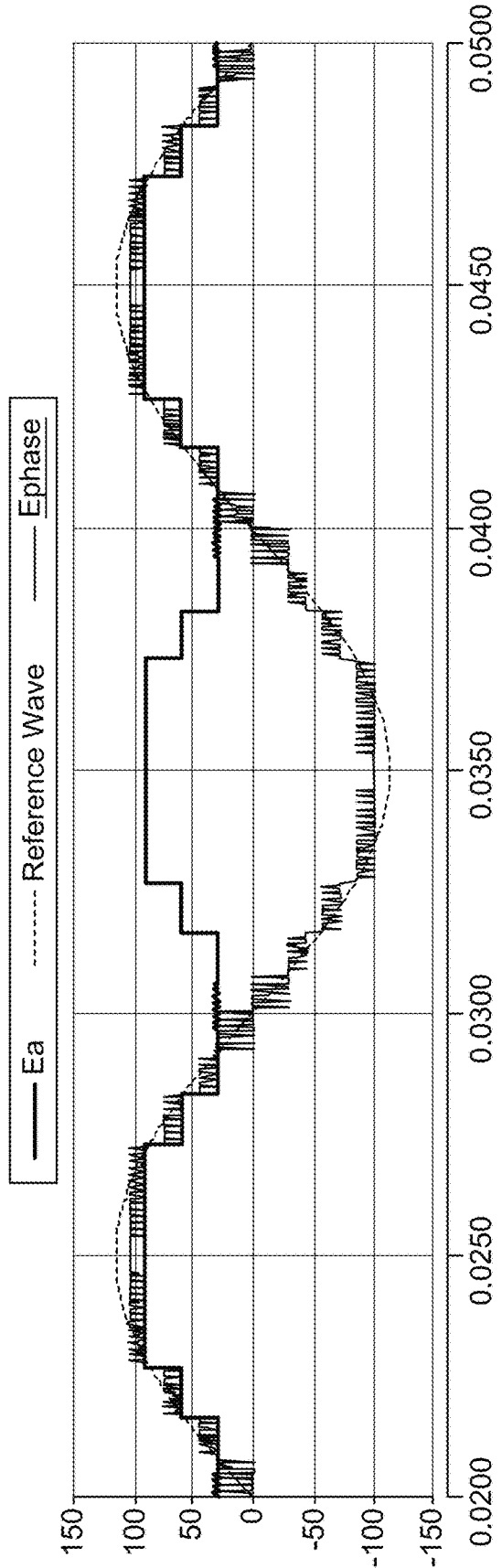
Figure 11D:
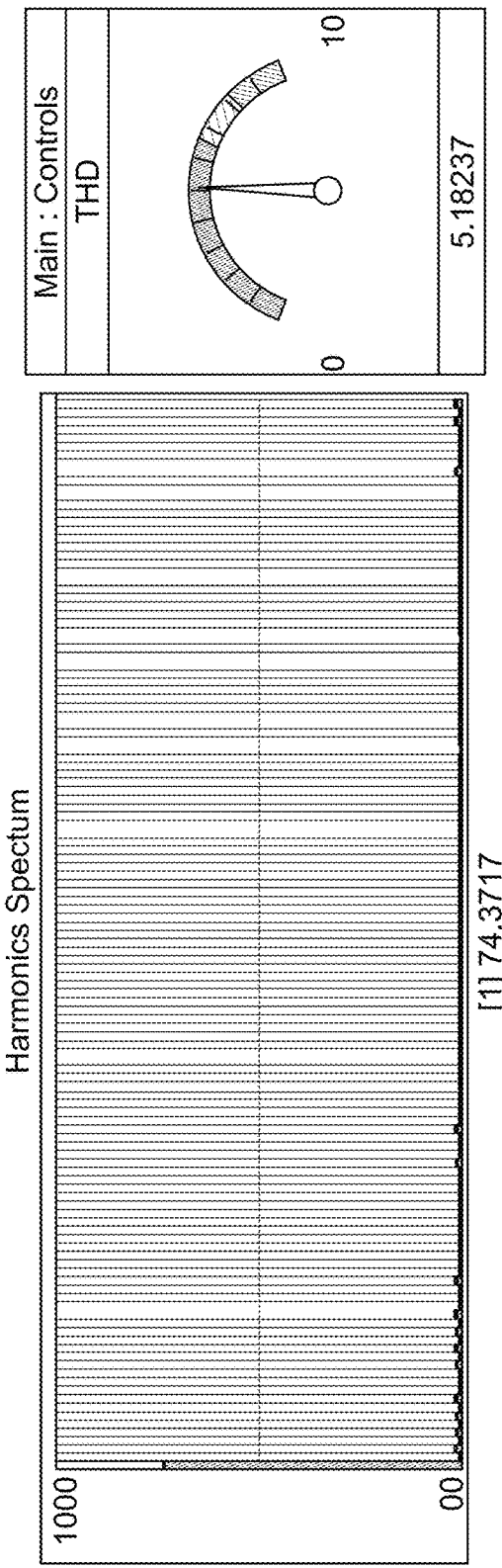

The simulation was performed with modulation index of 1.143 with carrier signal frequency at 7.5 kHz to illustrate the stresses across the switches. The output voltage waveform in MODE II is shown in FIG. 11C and the FFT of the output voltage is given in FIG. 11D. The output voltage THD is 5.183% as shown on the meter inset to the right of FIG. 11D. The output voltage waveform also satisfies the IEEE 519 standard, i.e., the THD amount is less than 8% and the magnitude of individual harmonic order is less than 5%.

Figure 11E:
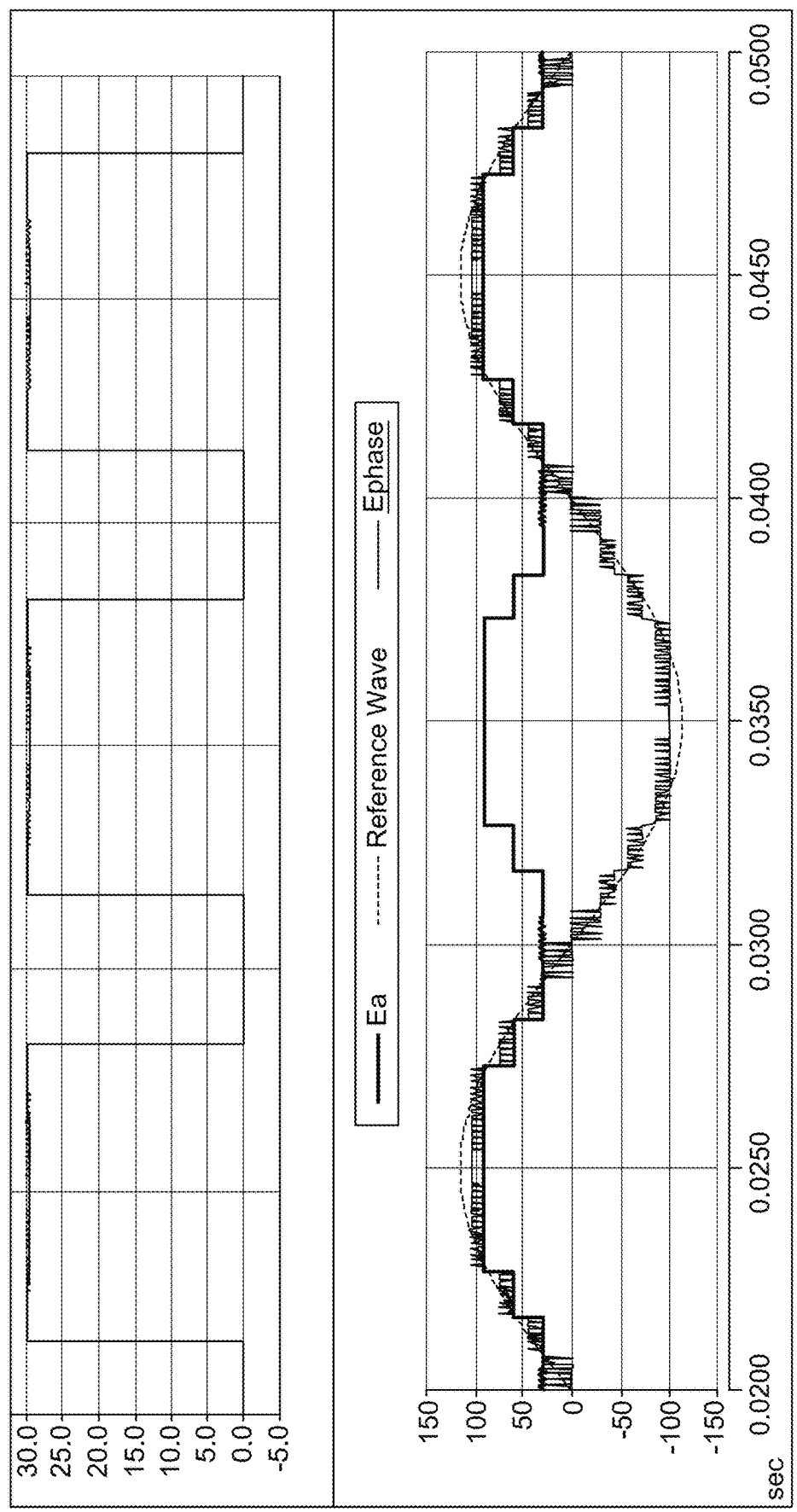
Figure 11F:
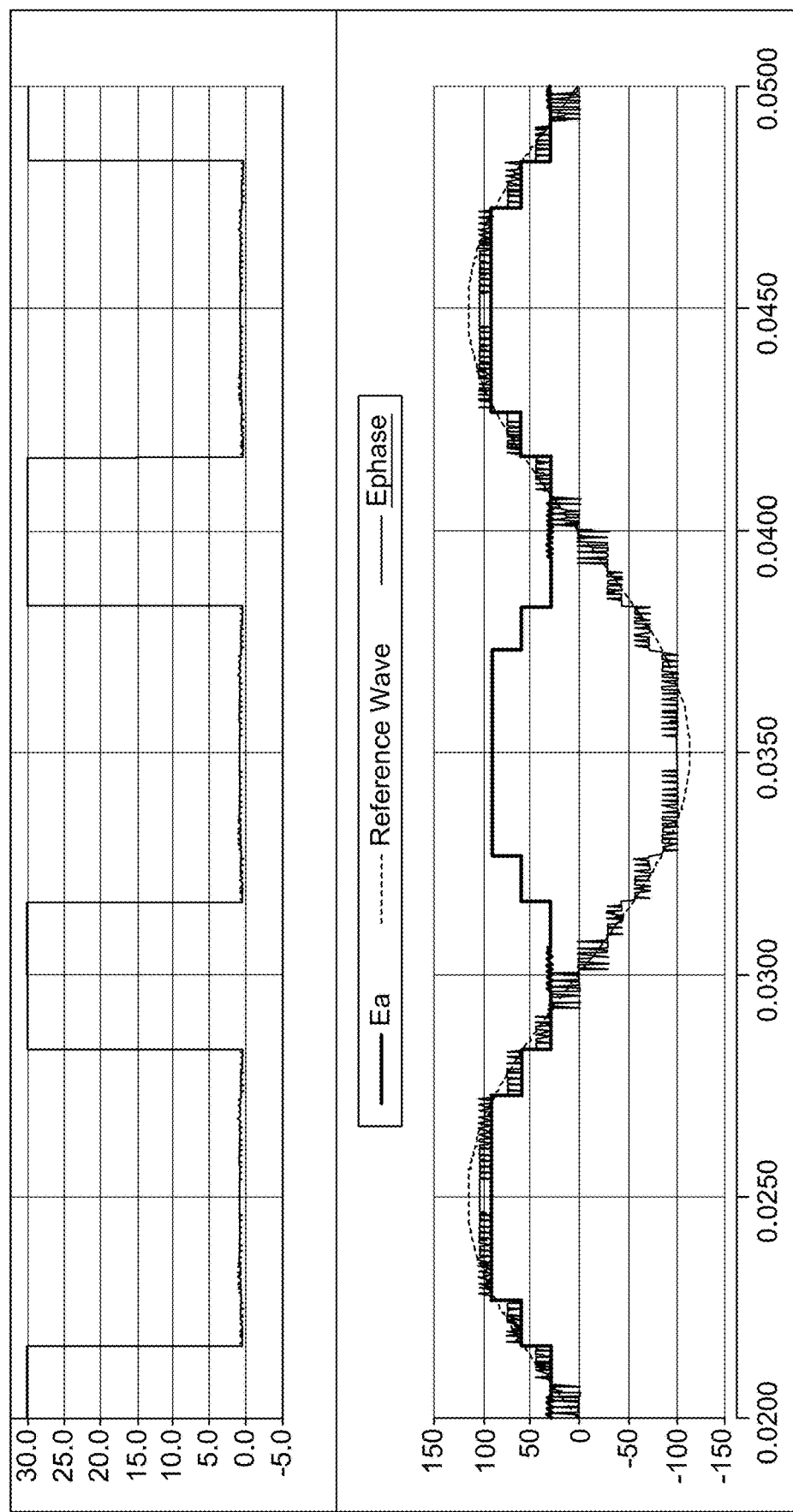
Figure 11G:
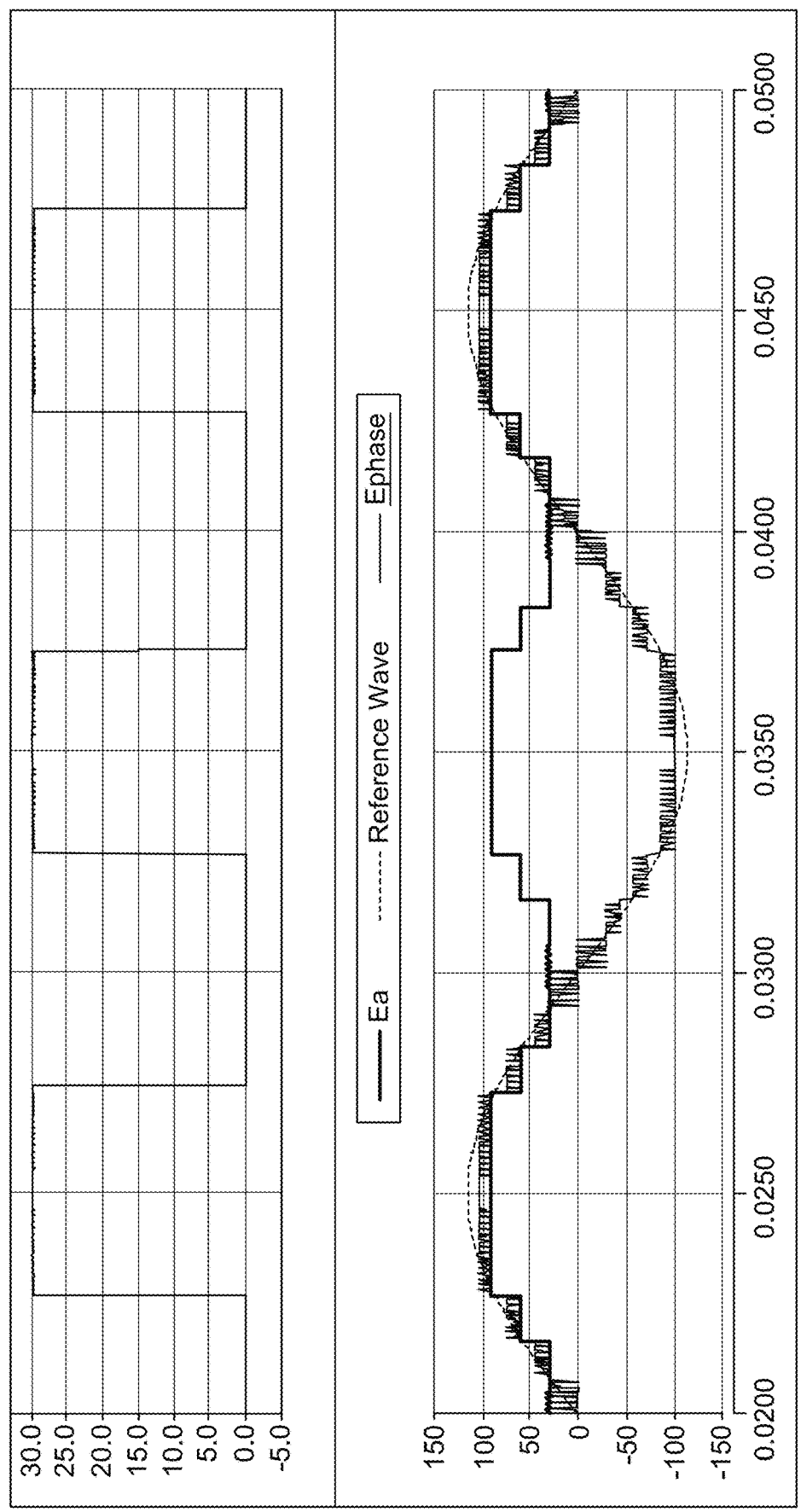
Figure 11H:
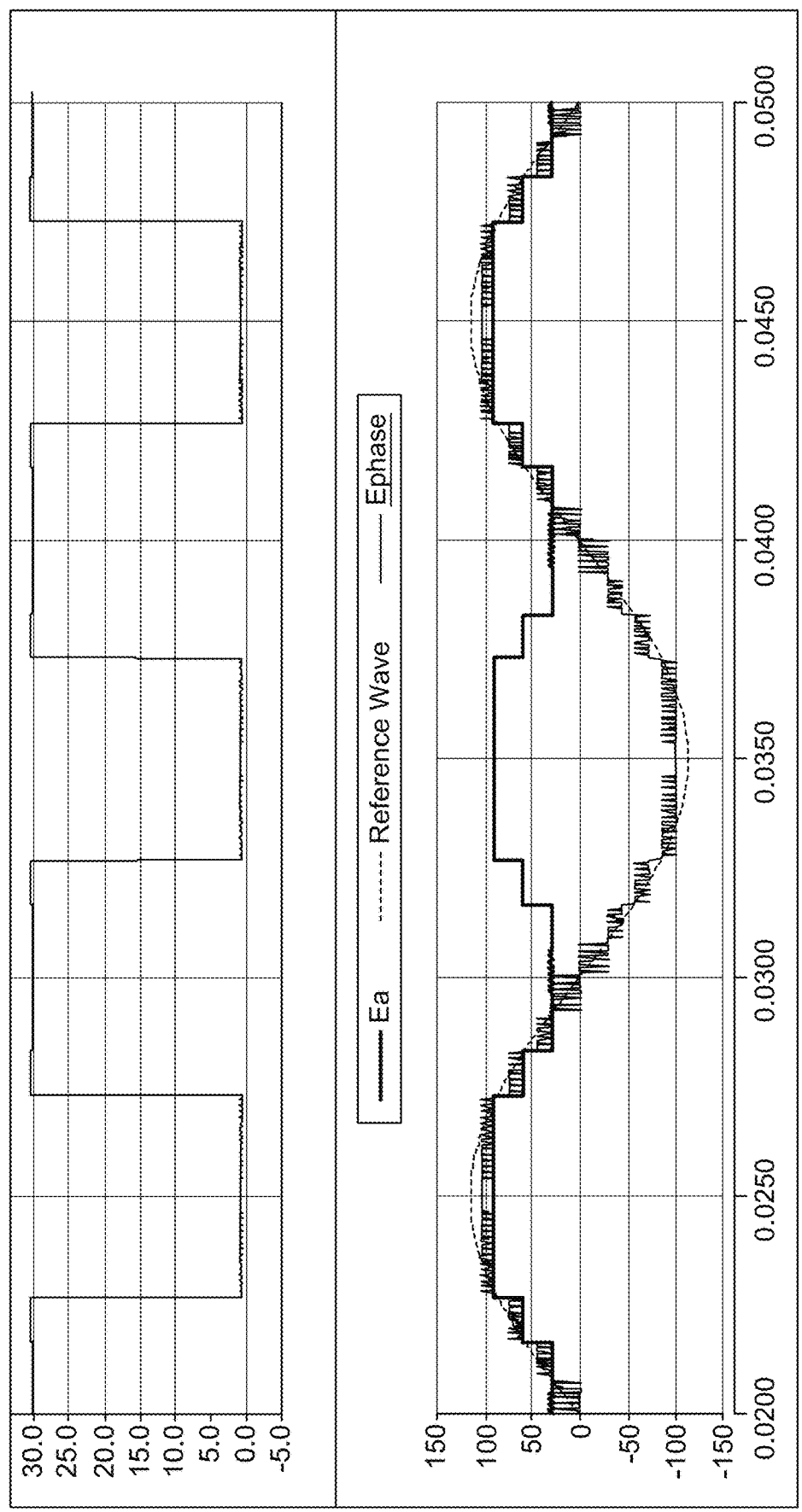

FIG. 11E shows the voltage stress across switch $S_1$ and FIG. 11F illustrates the voltage stress for switch $S_2$. The voltage stress across switch $S_3$ will be same as that of voltage stress across switch $S_1$. Similarly, FIG. 11G and FIG. 11H display the voltage stresses of switches $S_4$ and $S_5$ respectively. From these figures, it is clear that the voltage stress across each switch of the LGM is fixed at Vdc=30V, as shown in the upper trace of each figure. Additionally, only two switch transitions, i.e. one from the ON to the OFF state and another from the OFF to the ON state, occur for each switch during either the positive or the negative half cycle, which minimizes the switching losses associated with each switch.

Figure 12A:
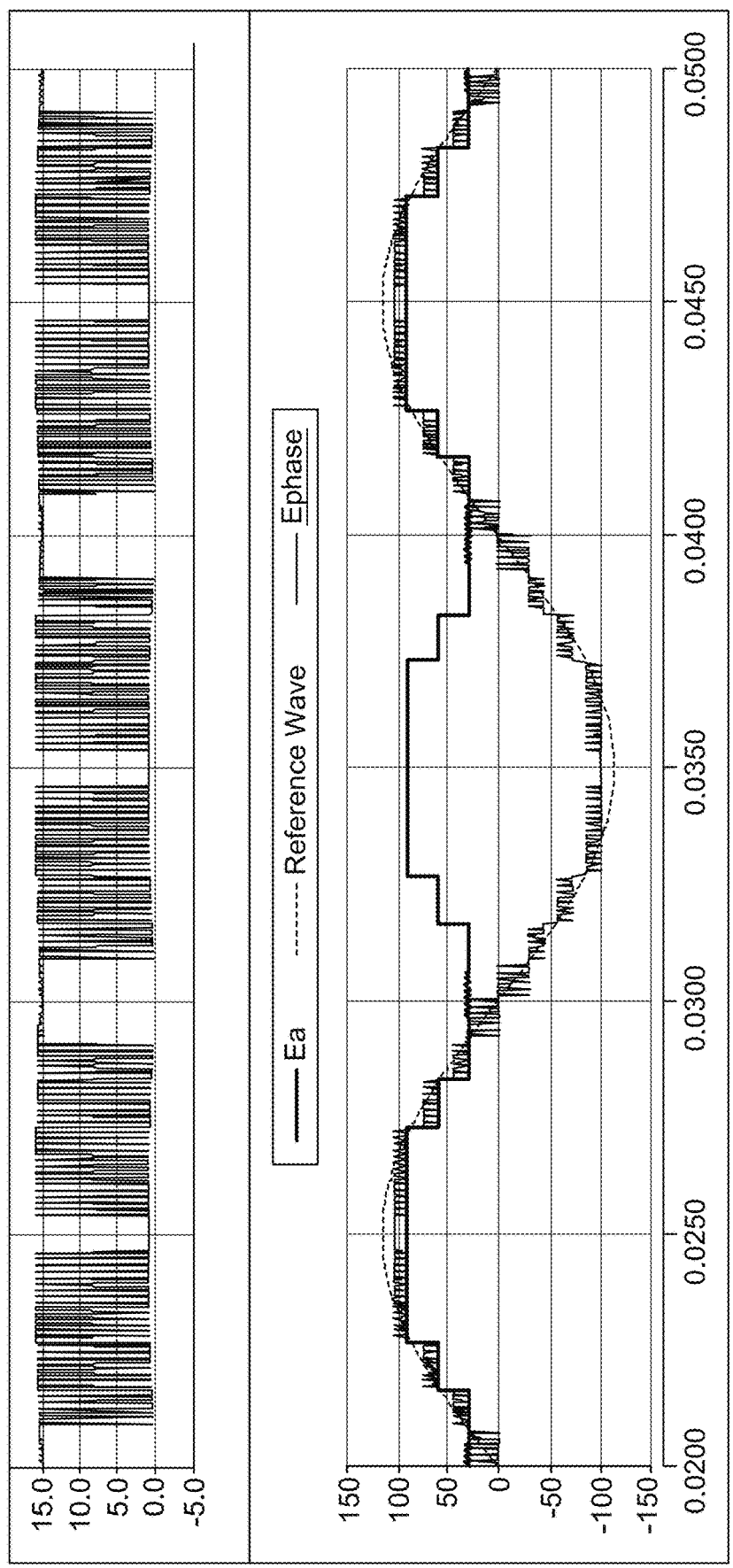
FIG. 12A illustrates the voltage stress across switch $Sa_1$.
Figure 12B:
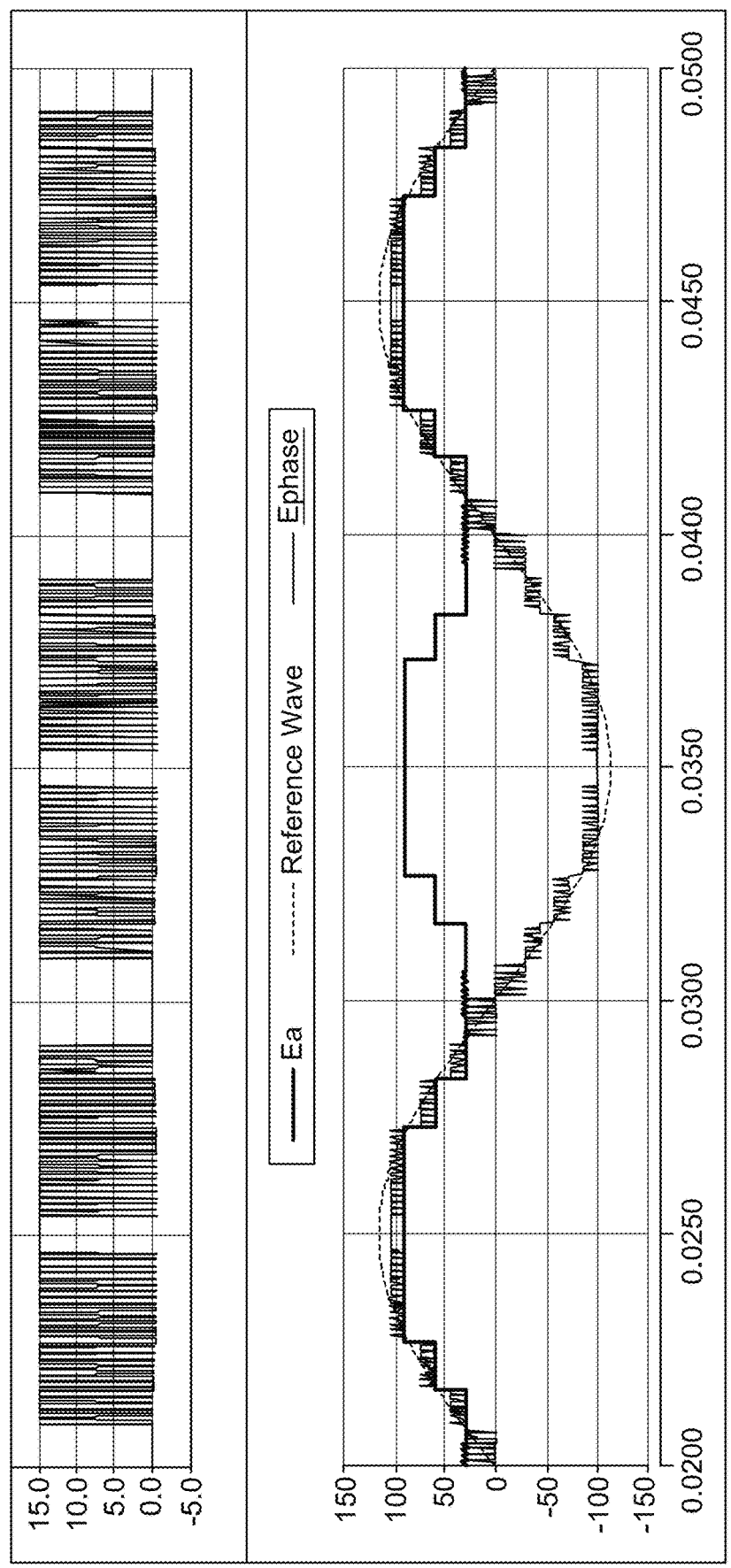
FIG. 12B illustrates the the voltage stress across switch $Sa_2$.

The voltage stress across switches $S_{a1}$ and $S_{a2}$ is portrayed in FIGS. 12A and 12B, respectively. Both switches are operated at high frequency but at a lower voltage. This operation reduces the switching losses of both switches. As a result, a smart selection of operating frequency of all switches and voltage magnitude of dc voltage sources reduces the overall switching losses of the multilevel inverter.

The first embodiment is illustrated with respect to FIG. 4, 5, 18, 19-22. The first embodiment describes a hybrid multilevel inverter 400, comprising a level generation module 410; an auxiliary module 420 in series with the level generation module; and a polarity changing unit 430 in series with the level generation module and the auxiliary module; and a controller (microcontroller, FIG. 18, 1900, FIG. 19) having circuitry operatively connected to switches ($S_1$-$S_{3k}$, $S_{a1}$, $S_{a2}$, $H_1$-$H_4$, FIG. 4) located in the level generation module, the auxiliary module and the polarity changing unit.

The level generation module 410 comprises a k number of cells (Cell 1, Cell, 2, . . . , Cell 2, FIG. 4), each cell consisting of first, second and third unidirectional switches (for example, $S_1$, $S_2$, $S_3$ in Cell 1) and one DC voltage source (for example, $V_1$ in Cell 1), a k+1th DC voltage source ($V_{k+1}$) connected between the kth cell and the auxiliary module, wherein a first cell is configured such that actuation of the first and third switch to an ON status and the second switch to an OFF status places the DC voltage in parallel with the DC voltage of a second cell, wherein the first cell is configured such that actuation of the second switch to an ON status and the first and third switch to an OFF status places the DC voltage in series with the DC voltage of a second cell, wherein the kth cell is configured such that actuation of the kth first and kth third switch to an ON status and the kth second switch to an OFF status places the kth DC voltage in parallel with the k+1th DC voltage source of the kth cell, wherein the kth cell is configured such that actuation of the kth second switch to an ON status and the kth first and kth third switch to an OFF status places the kth DC voltage in series with the k+1th DC voltage source of the kth cell, and wherein the controller is configured to change the status of each switch.

As shown in FIG. 4, the auxiliary module 420 further comprises two unidirectional auxiliary switches ($S_{a1}$, $S_{a2}$) and an auxiliary DC voltage source, $V_a$, wherein a first ($S_{a1}$) of the two auxiliary unidirectional switches is in series with the auxiliary DC voltage source, $V_a$, and wherein a second ($S_{a2}$) of the two auxiliary unidirectional switches is in parallel with the first of the two auxiliary unidirectional switches and the auxiliary DC voltage source, wherein the controller is operatively configured to actuate the first auxiliary unidirectional switch to add the auxiliary DC voltage source to the level generation module, and wherein the controller is operatively configured to actuate the second auxiliary unidirectional switch to bypass the auxiliary DC voltage source.

The polarity changing unit 430 further comprises four polarity changing unidirectional switches ($H_1$-$H_4$) and two load terminals (432, 434), wherein the four polarity changing unidirectional switches are operatively connected in an H-bridge configuration, wherein the load terminals are located at a center of the H-bridge, and wherein the controller is configured to actuate the four polarity changing unidirectional switches to provide positive DC voltage or negative DC voltage to the load terminals.

The controller is further configured to operate the switches by hybrid modulation.

Each switch is an insulated-gate bipolar transistor (IGBT) and each DC voltage source in the level generation module and the auxiliary DC voltage source has the same voltage value.

Alternatively, each DC voltage source in the level generation module has the same voltage value and the auxiliary DC voltage source may have a voltage value equal to one-half of the voltage value of a DC voltage source in the level generation module, wherein the controller is further configured to apply k square wave pulses to the switches of the level generation module to modulate the ON and OFF status of each switch.

The second embodiment is illustrated with respect to FIG. 4, 18, 19-22. The second embodiment describes a method for voltage level generation in a hybrid multilevel inverter 400, comprising applying to each switch ($S_1$-$S_{3k}$) in a level generation module 420 having k+1 voltage generation cells, by a controller (microcontroller, FIG. 18, 1900, FIG. 19) operatively connected to and having program instructions configured for hybrid modulation (see CPU 1901 and memory 1902, FIG. 19), k square wave modulation pulses to generate a first voltage level output, applying to each switch ($S_{a1}$, $S_{a2}$) in an auxiliary voltage generation module including an auxiliary voltage source, $V_a$, by the controller, a square wave modulation pulse which either places the auxiliary voltage source in series with the first voltage level output or bypasses the auxiliary voltage source and generating a second voltage level output, applying to each of four switches ($H_1$-$H_4$) arranged in an H-bridge configuration in a polarity changing module 430 connected in series with the auxiliary voltage generation module, by the controller, a square wave modulation pulse which changes an operational status of the switch to either ON or OFF. If a first two diagonally located switches ($H_1$ and $H_4$, for example) of the four switches are have an ON status and a second two diagonally located switches ($H_2$ and $H_3$, for example) of the four switches are have an OFF status, then the second voltage level output is applied across load terminals of the H-bridge and if a second two parallel switches ($H_1$ and $H_3$ or $H_2$ and $H_4$) of the four switches both have an ON status or both have an OFF status, then the second voltage level output is not applied across the load terminals of the H-bridge.

K square wave modulation pulses are applied to each switch in the level generation module to generate the first voltage level output which ranges from one to k times a voltage value of a voltage source within a voltage generation cell, wherein the number of levels generated is given by: $N_{levels}=2(k+1)$. Further, square wave modulation pulses may be applied to each switch in the hybrid multilevel inverter to generate a number of voltage levels across the load terminals given by: $N_{levels}=4(k+1)$.

In an alternative, a zero level voltage is generated by applying, by the controller, an ON pulse to each of two parallel switches ($H_2$ and $H_4$) in the polarity changing unit, wherein each of the two parallel switches are connected at a first end to a load terminal (432 or 434, FIG. 4) and at a second end to a negative terminal of the voltage source in the first cell ($V_1(-)$), wherein the number of voltage levels across the load terminals is given by $N_{levels}=4(k+1)+1$.

The method includes calculating the total standing voltage (TSV) across the switches of the hybrid multilevel inverter by $TSV=\frac{7}{2}(7Nlevels+3)\times V_{dc}$, where $V_{dc}$ is the value of a voltage source of the level generation module, and minimizing the maximum stress across the switches by adjusting the number of levels and the value of the voltage source of the level generation module.

Alternatively, when the zero level is added, the method includes calculating the total standing voltage (TSV) across the switches of the hybrid multilevel inverter by $TSV=\frac{7}{4}N\times V_{dc}$, where $V_{dc}$ is the value of a voltage source of the level generation module, and minimizing the maximum stress across the switches by adjusting the number of levels and the value of the voltage source of the level generation module.

The third embodiment is illustrated with respect to FIG. 4, 18, 19-22. The third embodiment describes a system for voltage level generation in a switched series/parallel sources (SSPS) hybrid multilevel inverter 400, comprising a level generation module 410 having k voltage generation cells (Cell 1, Cell, 2, . . . , Cell 2, FIG. 4), k+1 DC voltage sources and 3k switches, an auxiliary module 420 in series with the level generation module, the auxiliary module having two switches ($S_{a1}$, $S_{a2}$) and an auxiliary DC voltage source, $V_a$, and a polarity changing unit 430 in series with the level generation module and the auxiliary module, the polarity changing unit having four switches ($H_1$-$H_4$) and two load terminals (432, 434, FIG. 4), and a controller having circuitry operatively connected to the switches located in the level generation module, the auxiliary module and the polarity changing unit, applying, by the controller further having program instructions stored therein that, when executed by one or more processor, cause the one or more processors (see CPU 1901 and memory 1902, FIG. 19) to perform hybrid modulation, k square wave modulation pulses to each switch in the level generation module 410, and generating a first voltage level output, applying, by the controller, to each switch in the auxiliary voltage generation module 420 including an auxiliary voltage source, a square wave modulation pulse which either places the auxiliary voltage source in series with the first voltage level output or bypasses the auxiliary voltage source and generates a second voltage level output, applying, by the controller, to each of four switches ($H_1$-$H_4$) in the H-bridge configuration of the polarity changing module 430, a square wave modulation pulse which changes an operational status of the switch to either ON or OFF, wherein, if a first two diagonally located switches ($H_1$ and $H_4$, for example) of the four switches are have an ON status and a second two diagonally located switches ($H_2$ and $H_3$, for example) of the four switches are have an OFF status, then the second voltage level output is applied across load terminals of the H-bridge, wherein, if a second two parallel switches ($H_1$ and $H_3$ or $H_2$ and $H_4$) of the four switches both have an ON status or both have an OFF status, then the second voltage level output is not applied across the load terminals of the H-bridge.

The system includes applying, by the controller, the k square wave modulation pulses to each switch in the level generation module to generate the first voltage level output which ranges from one to k times a voltage value of a voltage source within a voltage generation cell, wherein the number of levels generated is given by, $N_{levels}=2(k+1)$, and applying, by the controller, square wave modulation pulses to each switch in the auxiliary module and the polarity changing module to generate a number of voltage levels across the load terminals given by, $N_{levels}=4(k+1)$.

Alternatively, the system includes generating a zero level by applying, by the controller, an ON pulse to each of two parallel switches in the polarity changing unit, wherein each of the two parallel switches are connected at a first end to a load terminal and at a second end to a negative terminal of the voltage source in the first cell, wherein the number of voltage levels across the load terminals is given by, $N_{levels}=4(k+1)+1$.

The system includes calculating the total standing voltage (TSV) across the switches of the hybrid multilevel inverter by, $TSV=\frac{7}{2}(Nlevels+3)\times V_{dc}$, where $V_{dc}$ is the value of a voltage source of the level generation module, and minimizing the maximum stress across the switches by adjusting the number of levels and the value of the voltage source of the level generation module.

Alternatively, when the zero level is added, the system includes calculating the total standing voltage (TSV) across the switches of the hybrid multilevel inverter by, $TSV=\frac{7}{4}N\times V_{dc}$, where $V_{dc}$ is the value of a voltage source of the level generation module, and minimizing the maximum stress across the switches by adjusting the number of levels and the value of the voltage source of the level generation module.

Figure 18:
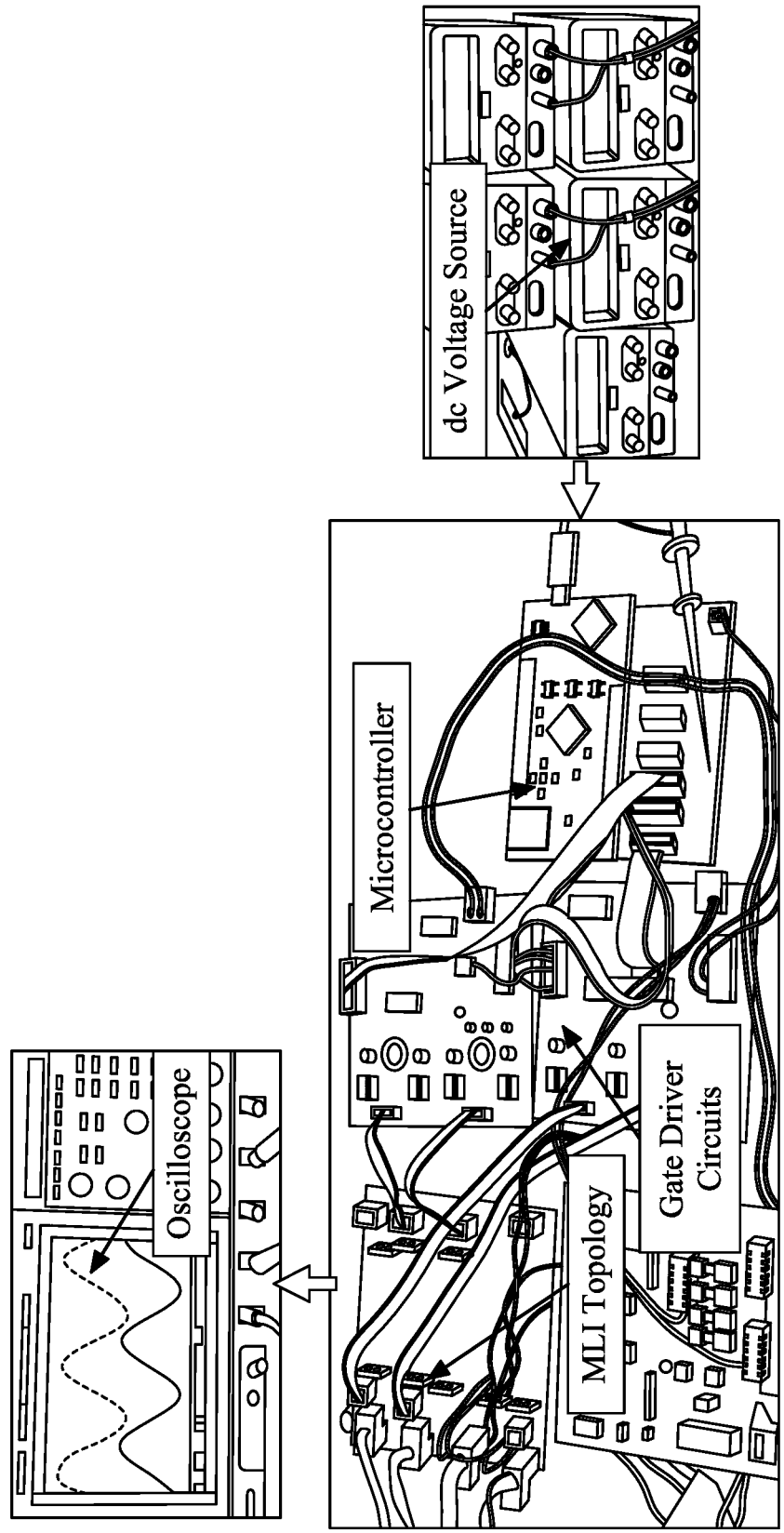
FIG. 18 illustrates the experimental hybrid multilevel inverter circuit components.

To demonstrate the operation of the multilevel circuit of the present disclosure, a 300 W, twelve level (13 levels with zero level in Mode II) hybrid multilevel inverter was designed and constructed. Three DC sources were used in the LGM (i.e., k=2); the voltage of each DC source was set to 30 V with one DC voltage source for the AM (thus a total of four DC voltage sources are used). The power circuit used in the experiment was based on the IKB20N60H3 IGBT (600 V/20 A) (See IGBT, IKB20N60H3 Data Sheet, by Infineon Technologies AG, 81726 Munchen, Germany). The switching frequency of the PWM waveform for the auxiliary circuit is 7.5 kHz. To implement the modulation, a XE 166 Infineon microcontroller was used (See XE166 Family-Hardware Manual XE166 Low End Easy Kit Board V1.5, by Infineon Technologies AG, 81726 München, Germany). The gate pulses from the microcontroller were adjusted for the switches using the gate driver circuits. A dead time of 0.5 µs was added to protect the bridge from shoot-through fault. A photograph of the hybrid multilevel inverter arrangement with the DC sources and measurement instrument is shown in FIG. 18. Since the inverter is bidirectional, it was tested using resistive and inductive loads. Furthermore, the auxiliary module can be turned off at convenience, thus comparisons were readily made for the circuit with and without the auxiliary module.

Figure 13:
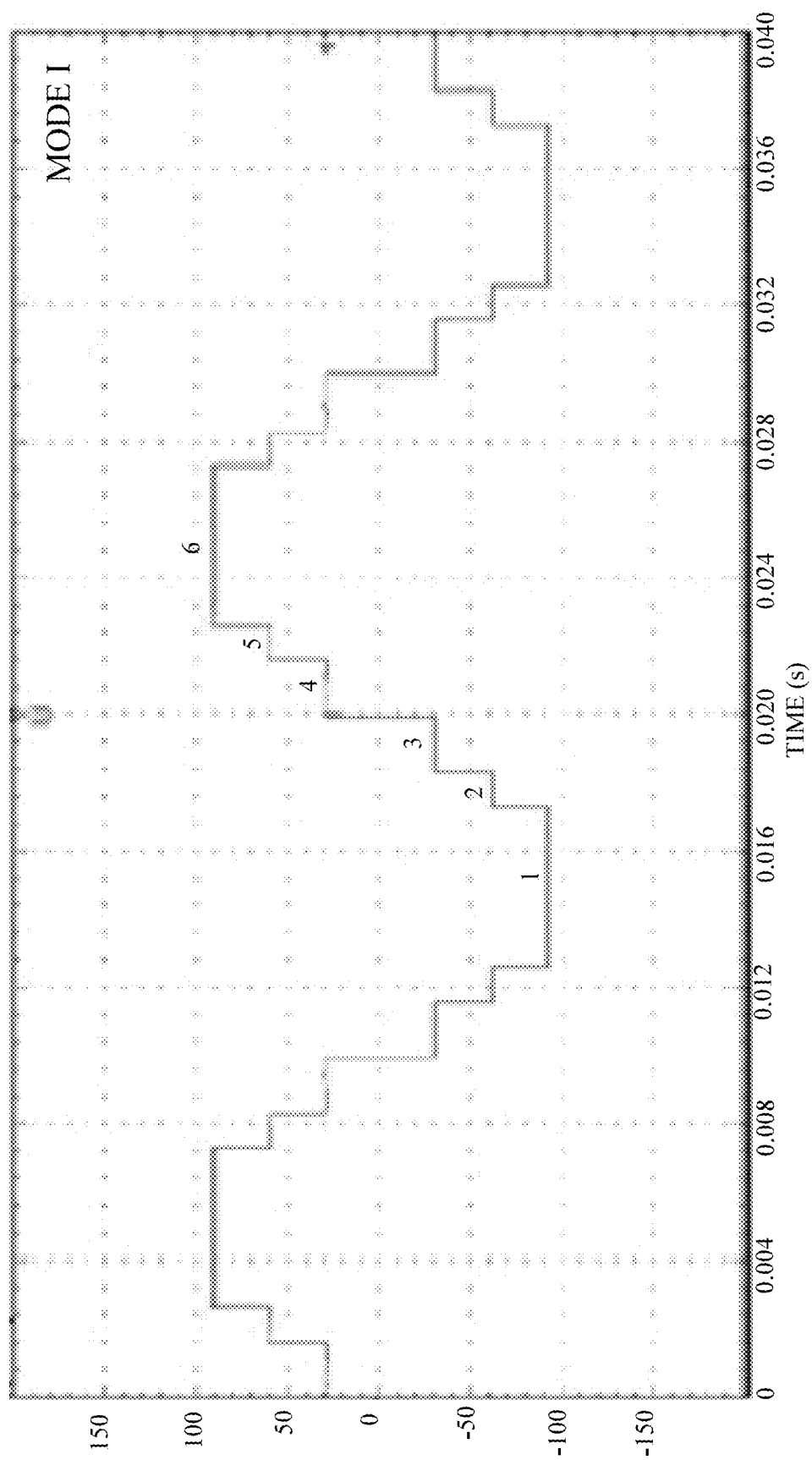
FIG. 13 illustrates the experimental output voltage (top trace) in Mode I under no load conditions.

FIG. 13 shows the experimental output voltage of the hybrid multilevel inverter in Mode I, under the no-load condition. The modulation index is set to be the same as in the simulation, i.e., 1.14. The vertical scale is 50 V/div. The horizontal scale is 4.0 ms/div. As can be observed, the waveform is very similar to the simulated waveform shown in FIG. 9A. This confirms the practical working operation of the LGM and the PCU.

Figure 14A:
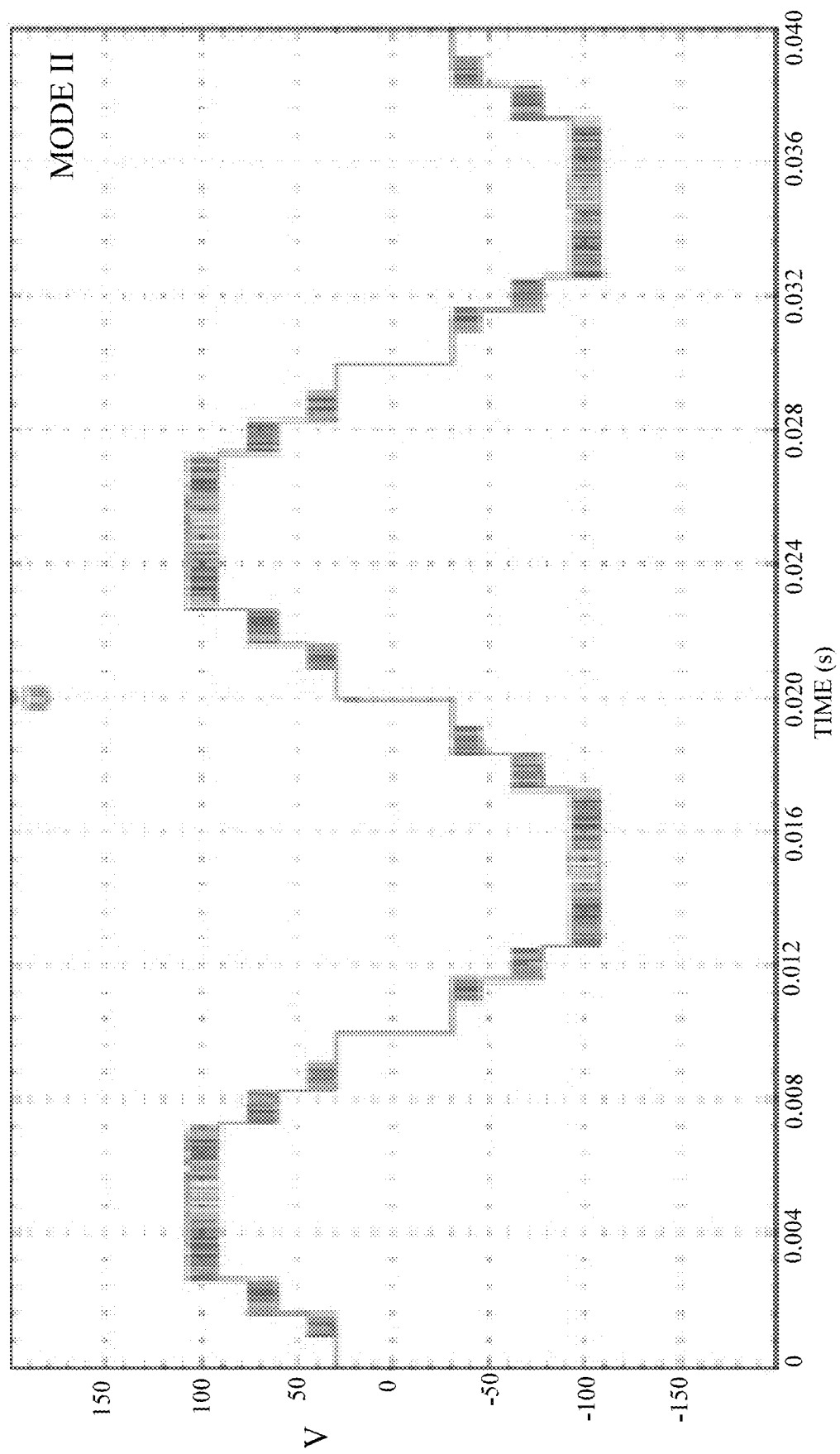
FIGS. 14A-14B illustrate the experimental output voltage in Mode II under a no load condition (A) without zero level (B) with zero level.
Figure 14B:
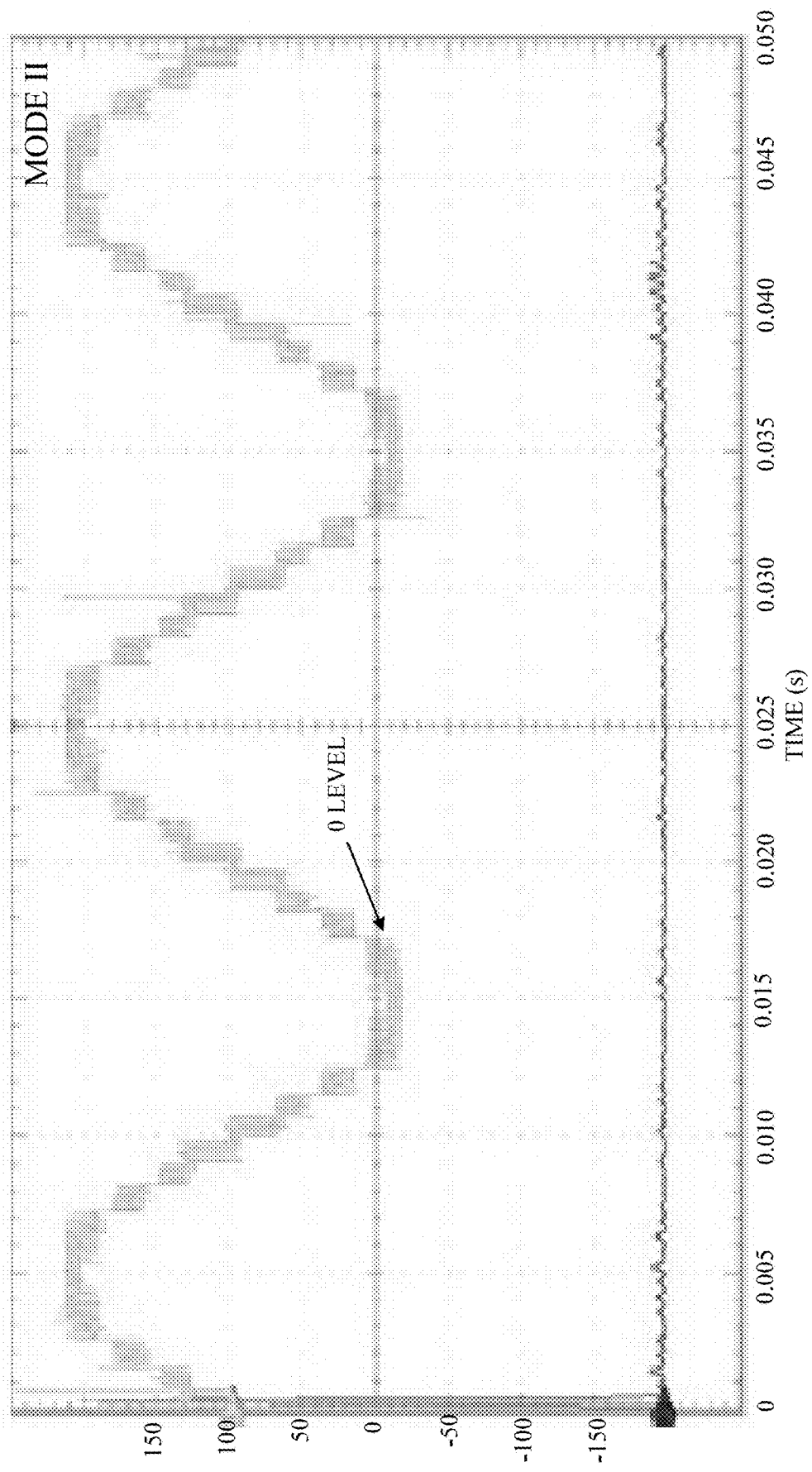

The output voltage with the AM in Mode II under no load conditions is depicted in FIGS. 14A and 14B. The first waveform, i.e., FIG. 14A, is without the zero level. As expected, the number of levels increased from six to twelve. The second waveform, i.e., FIG. 14B is obtained when the zero level is generated. Again, the experimental waveform was in very close agreement with the simulation, shown by FIGS. 10A and 11A, respectively. The corresponding spectra depicts that the fundamental component is increased from 70 to 78 V. This is due to the additional level that is added on third level of the non-auxiliary case, as marked in FIG. 14B. Furthermore, the low order harmonics (which typically exist in stepped waveforms) are reduced with the introduction of modulated level in between the step. Note that for the modulation of the fringes by the auxiliary circuit results in the high frequency harmonics, clustered around the switching frequency, i.e. 7.5 kHz. However, is not an issue because these components can be easily filtered. The measured THD for the cases with and without auxiliary is 9% and 5% for, respectively.

Figure 15A:
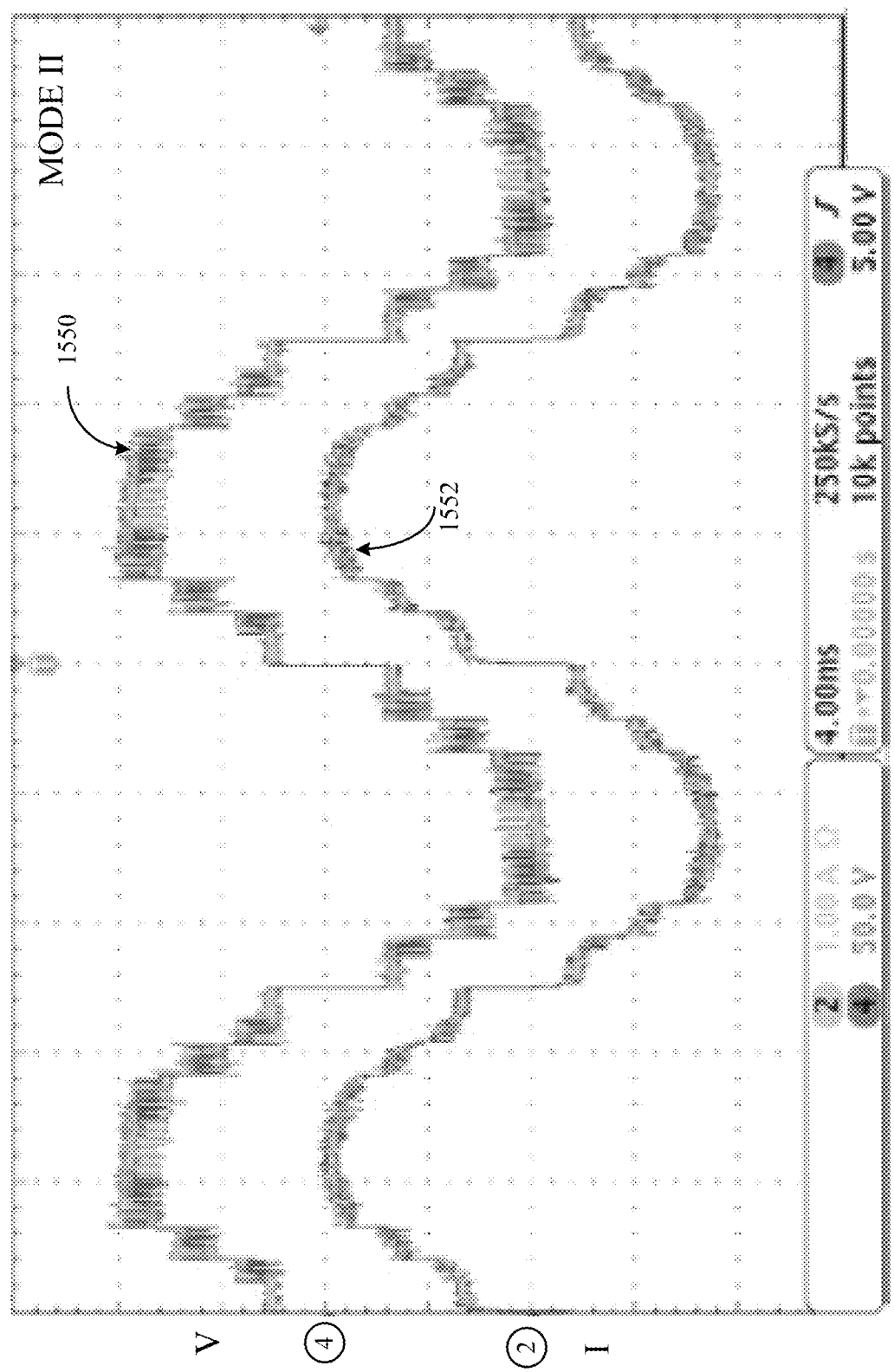
FIGS. 15A-15B illustrate the output voltage (top trace) and current (bottom trace) waveforms with resistive load (50Ω) without the auxiliary module (A) experimental (B) simulation results.
Figure 15B:
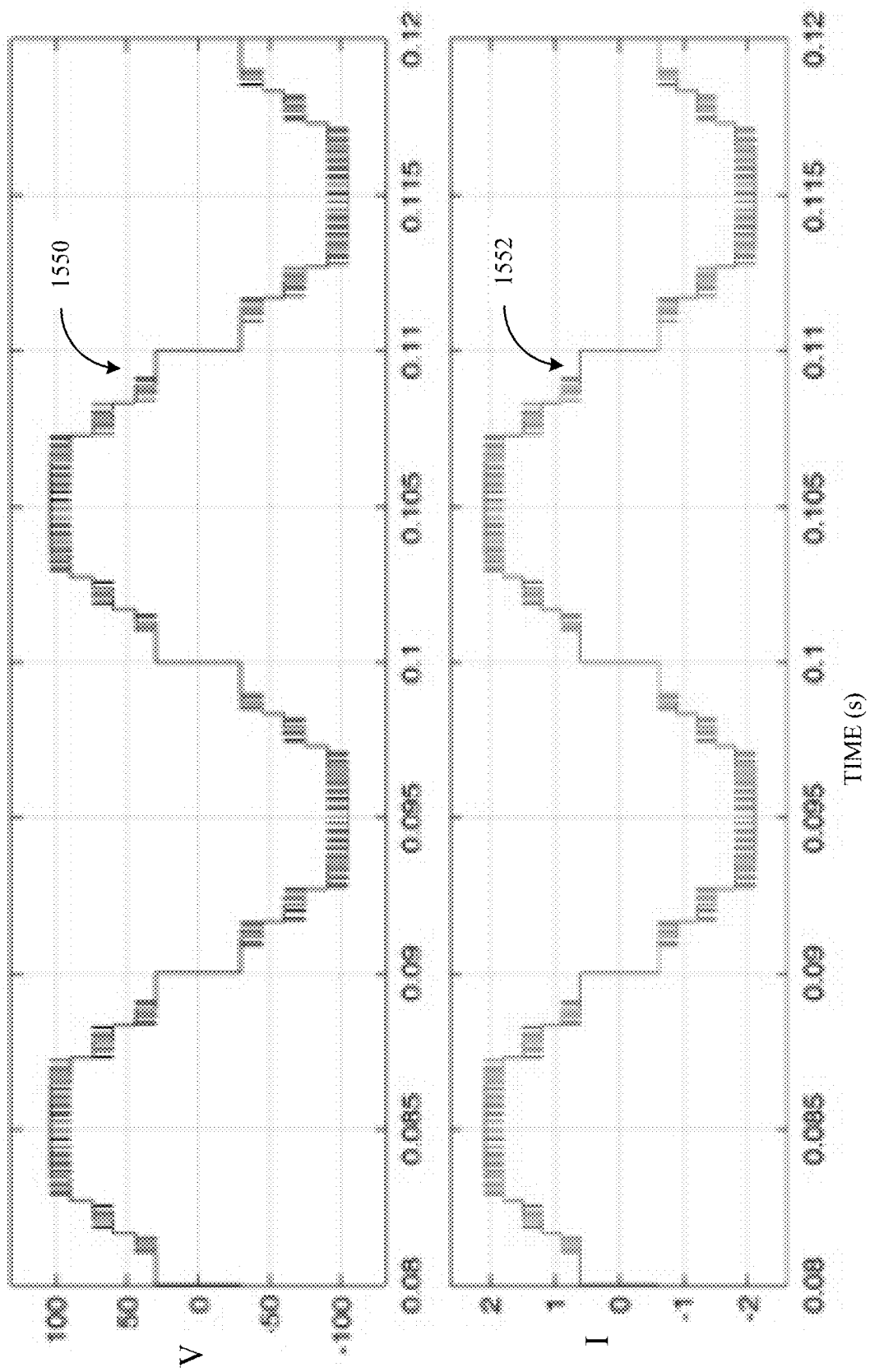

FIG. 15A shows the experimental voltage (top trace 1550) and the current outputs (bottom trace 1552) when the hybrid multilevel inverter is connected to a resistive load (50Ω) in Mode II. In this case, the zero level is not activated. FIG. 15B shows the simulated result for the current (top trace 1550) and current (bottom trace 1552) outputs. As expected, for the experimental case, the current follows the voltage, i.e., in phase. However, the waveshape of the former deviates slightly, where the PWM pulses are being rounded at their edges. This is due to the inductive effect of wire wound resistor used as the load. Note that the rounded edges are not observed in the simulation as an ideal resistive load is used in the model. The scale in FIG. 15A is 50 V/div and 1 A/div on the y axis and 0.004 s/div on the x axis.

Figure 16A:
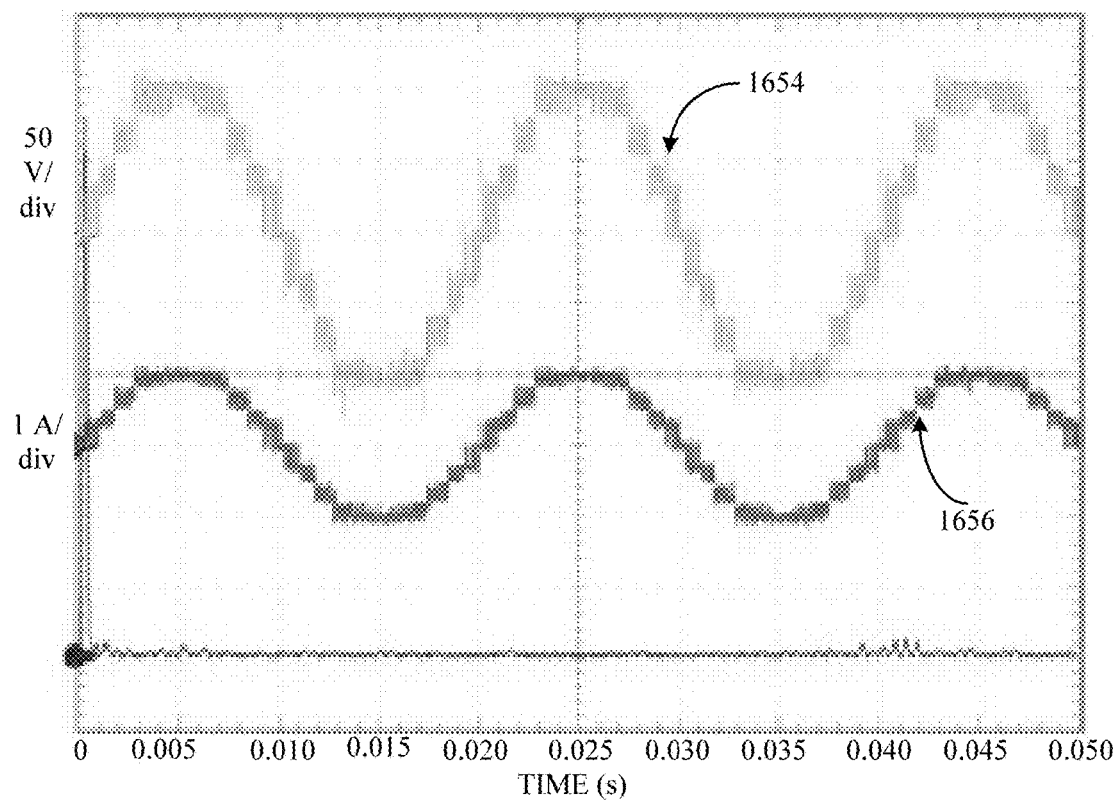
FIGS. 16A-16B illustrate the output voltage (top trace) and current (bottom trace) waveforms with resistive load (50Ω) with the auxiliary module (A) experimental (B) simulation results.
Figure 16B:
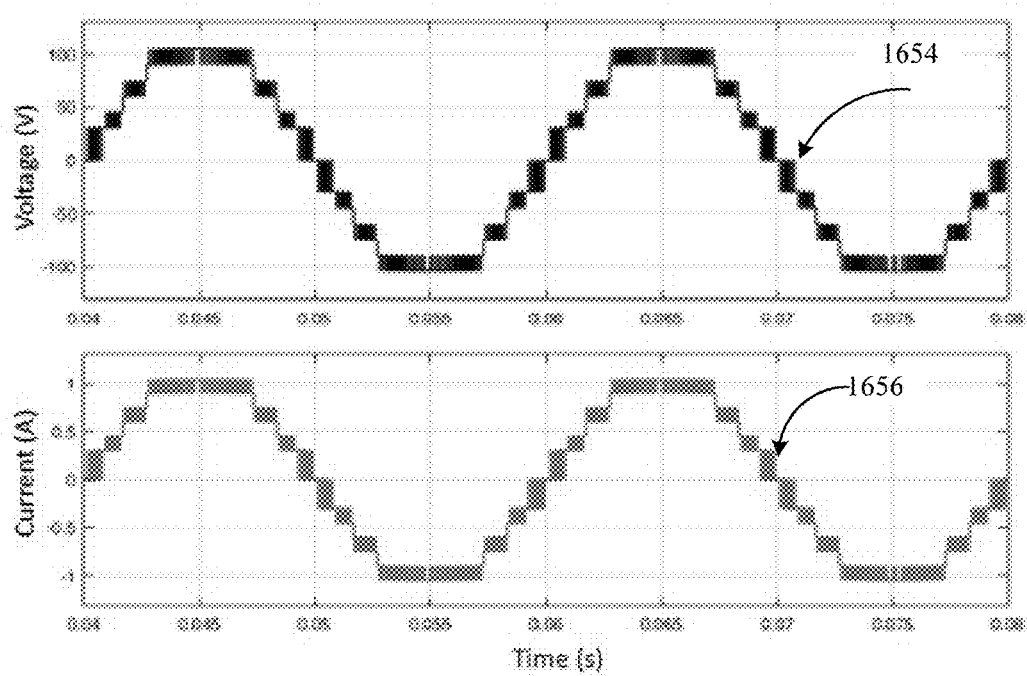

FIG. 16A, 16B depict the hybrid multilevel inverter output with a resistive load of 50Ω when the zero level generator is activated. Clearly, the voltage waveform improves due to the introduction of an additional level at the zero crossing point. For all the comparisons, it can be observed that the experimental results are in close agreement with the simulation. In FIG. 16A, the top graph 1654 represents the experimental result for the output voltage and the bottom graph 1656 represents the experimental result for the current output. The voltage scale is 50 V/div. and the current scale is 1 A/div. In FIG. 16B, the top graph 1654 represents the experimental result for the output voltage and the bottom graph 1656 represents the experimental result for the current output.

Figure 17A:
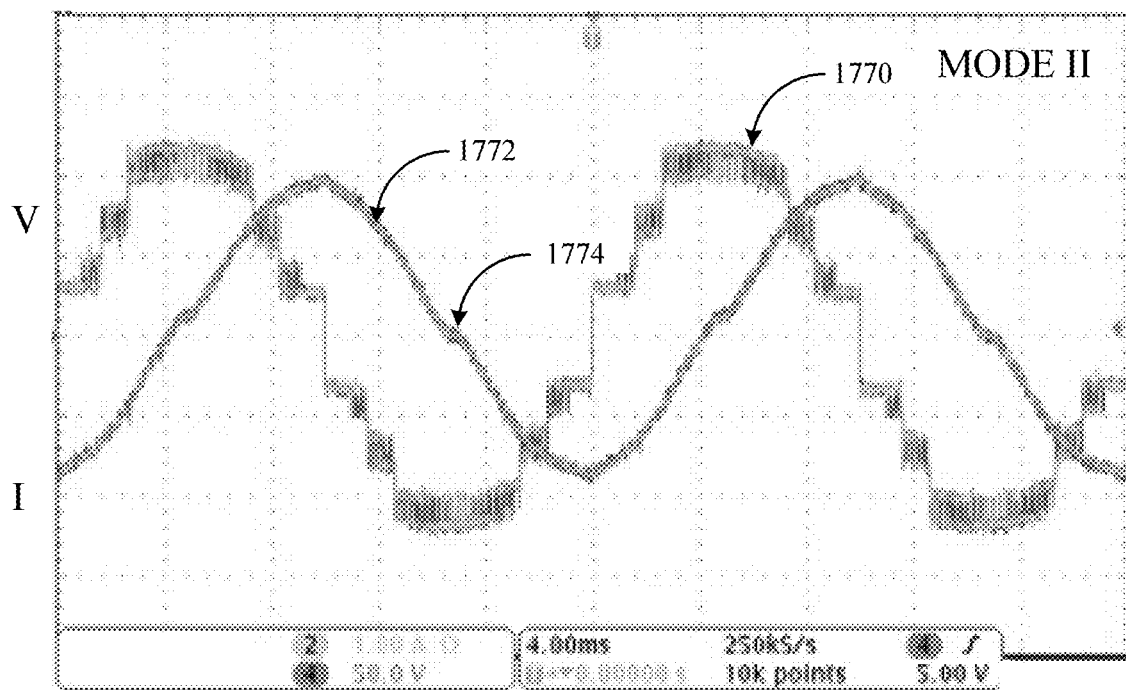
FIGS. 17A-17B illustrate the output voltage (top trace) and current (bottom trace) waveforms with resistive load of 50Ω in Mode II without the zero level (A) experimental (B) simulation results.
Figure 17B:
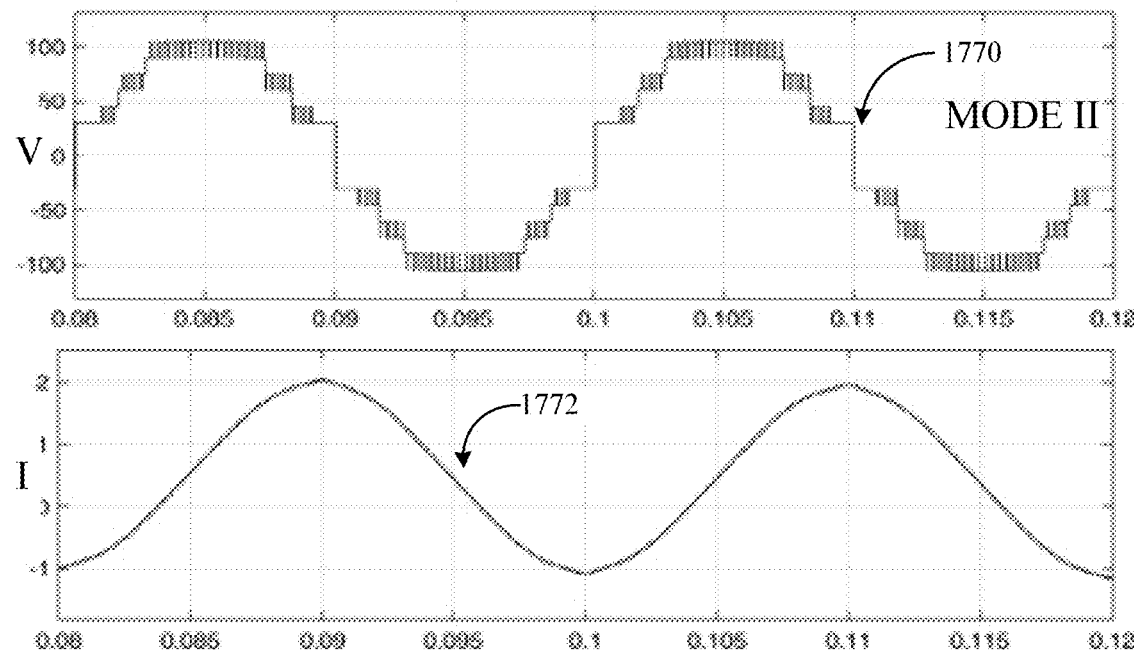

FIG. 17A demonstrates the experimental voltage 1770 and current 1772 waveforms of the hybrid multilevel inverter in Mode II when connected to an inductive load (R=10Ω, L=250 mH). The scale in FIG. 17A is 50 V/div and 1 A/div on the y axis and 0.004 s/div on the x axis. FIG. 17B shows the corresponding voltage 1770 and current 1772 simulation waveforms. As can be seen, the current lags the voltage by 83 degrees, which is consistent with the values used in the experiment. Further, a small current distortion 1774 occurs at the zero crossing point, which may be a result of the dead-time effect, as suggested by Murai et al. (1987). (See Murai, Y.; Watanabe, T.; Iwasaki, H. Waveform Distortion and Correction Circuit for PWM Inverters with Switching Lag-Times. *IEEE Trans. Ind. Appl.* 1987, IA-23, 881-886, incorporated herein by reference in its entirety). This result may be confirmed with the simulated current waveform shown in FIG. 17B. As can be seen, the distortion is not present; this is because the dead time is not included in the simulation. FIG. 17A,B demonstrate the waveforms of the output voltage and the current, respectively, when the zero crossing generator is connected. There is a slight improvement in the experimental current waveshape. By taking the FFT of the experimental current waveform, the total harmonic distortion without the auxiliary module is 7.6%. For the case with the auxiliary, the total harmonic distortion is reduced to 6.2%. For the simulated current waveforms, the total harmonic distortion is 3.1% and 2.5%, respectively. These results prove that the dead time contributes to more than half of the total harmonic distortion values.

In the present disclosure, a hybrid multilevel inverter topology with a reduced number of switches and DC voltage sources is described. The topology provides the flexibility needed for higher voltage and power requirements by using series and parallel operation of a set of DC voltage sources. The hybrid multilevel inverter shares the load current among the DC voltage sources. A hybrid modulation technique is used to operate the switches in the circuit. This modulation scheme provides high-voltage low-frequency and low-voltage high-frequency operations which reduce the switching losses. The topology was compared with several conventional multilevel inverter topologies to indicate the reduction of the number of switches and DC voltage sources. Finally, the performance of the topology was examined by generating 13 levels at the output using PSCAD and was verified through the experimental results.

Figure 19:
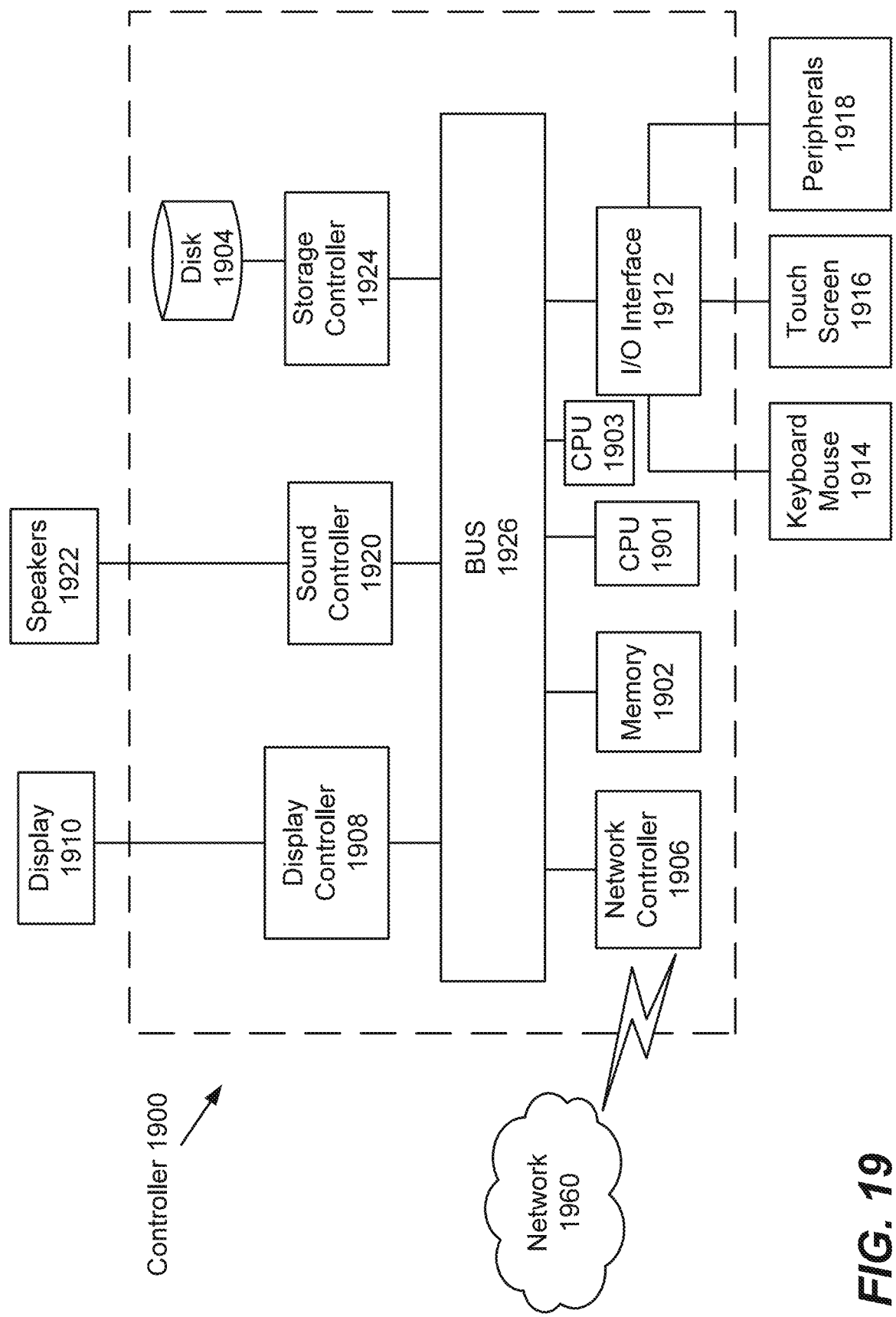
FIG. 19 is an illustration of a non-limiting example of details of computing hardware used in the computing system, according to certain embodiments.

Next, further details of the hardware description of the computing environment of FIG. 18 according to exemplary embodiments is described with reference to FIG. 19. In FIG. 19, a controller 700 is described is representative of the microcontroller of FIG. 18 in which the controller is a computing device which includes a CPU 1901 which performs the processes described above/below. The process data and instructions may be stored in memory 1902. These processes and instructions may also be stored on a storage medium disk 1904 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 1901, 1903 and an operating system such as Microsoft Windows 7, UNIX, Solaris, LINUX, Apple MAC-OS and other systems known to those skilled in the art.

The hardware elements in order to achieve the computing device may be realized by various circuitry elements, known to those skilled in the art. For example, CPU 1901 or CPU 1903 may be a Xenon or Core processor from Intel of America or an Opteron processor from AMD of America, or may be other processor types that would be recognized by one of ordinary skill in the art. Alternatively, the CPU 1901, 1903 may be implemented on an FPGA, ASIC, PLD or using discrete logic circuits, as one of ordinary skill in the art would recognize. Further, CPU 1901, 1903 may be implemented as multiple processors cooperatively working in parallel to perform the instructions of the inventive processes described above.

The computing device in FIG. 19 also includes a network controller 1906, such as an Intel Ethernet PRO network interface card from Intel Corporation of America, for interfacing with network 1960. As can be appreciated, the network 1960 can be a public network, such as the Internet, or a private network such as an LAN or WAN network, or any combination thereof and can also include PSTN or ISDN sub-networks. The network 1960 can also be wired, such as an Ethernet network, or can be wireless such as a cellular network including EDGE, 3G and 4G wireless cellular systems. The wireless network can also be WiFi, Bluetooth, or any other wireless form of communication that is known.

The computing device further includes a display controller 1908, such as a NVIDIA GeForce GTX or Quadro graphics adaptor from NVIDIA Corporation of America for interfacing with display 1910, such as a Hewlett Packard HPL2445w LCD monitor. A general purpose I/O interface 1912 interfaces with a keyboard and/or mouse 1914 as well as a touch screen panel 1916 on or separate from display 1910. General purpose I/O interface also connects to a variety of peripherals 1918 including printers and scanners, such as an OfficeJet or DeskJet from Hewlett Packard.

A sound controller 1920 is also provided in the computing device such as Sound Blaster X-Fi Titanium from Creative, to interface with speakers/microphone 1922 thereby providing sounds and/or music.

The general purpose storage controller 1924 connects the storage medium disk 1904 with communication bus 1926, which may be an ISA, EISA, VESA, PCI, or similar, for interconnecting all of the components of the computing device. A description of the general features and functionality of the display 1910, keyboard and/or mouse 1914, as well as the display controller 1908, storage controller 1924, network controller 1906, sound controller 1920, and general purpose I/O interface 1912 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 20.

Figure 20:
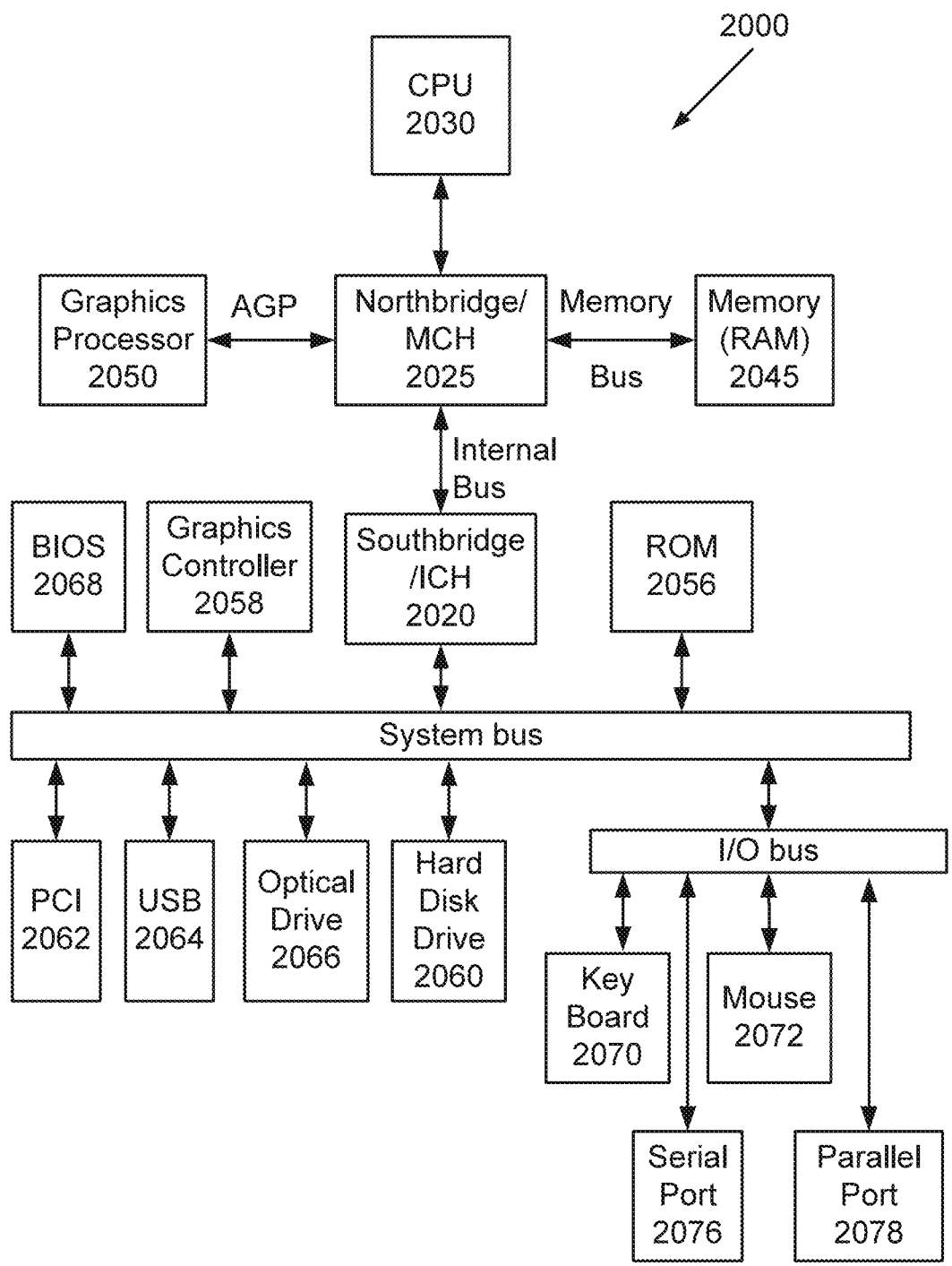
FIG. 20 is an exemplary schematic diagram of a data processing system used within the computing system, according to certain embodiments.

FIG. 20 shows a schematic diagram of a data processing system, according to certain embodiments, for performing the functions of the exemplary embodiments. The data processing system is an example of a computer in which code or instructions implementing the processes of the illustrative embodiments may be located.

In FIG. 20, data processing system 2000 employs a hub architecture including a north bridge and memory controller hub (NB/MCH) 2025 and a south bridge and input/output (UO) controller hub (SB/ICH) 2020. The central processing unit (CPU) 2030 is connected to NB/MCH 2025. The NB/MCH 2025 also connects to the memory 2045 via a memory bus, and connects to the graphics processor 2050 via an accelerated graphics port (AGP). The NB/MCH 2025 also connects to the SB/ICH 2020 via an internal bus (e.g., a unified media interface or a direct media interface). The CPU Processing unit 2030 may contain one or more processors and even may be implemented using one or more heterogeneous processor systems.

Figure 21:
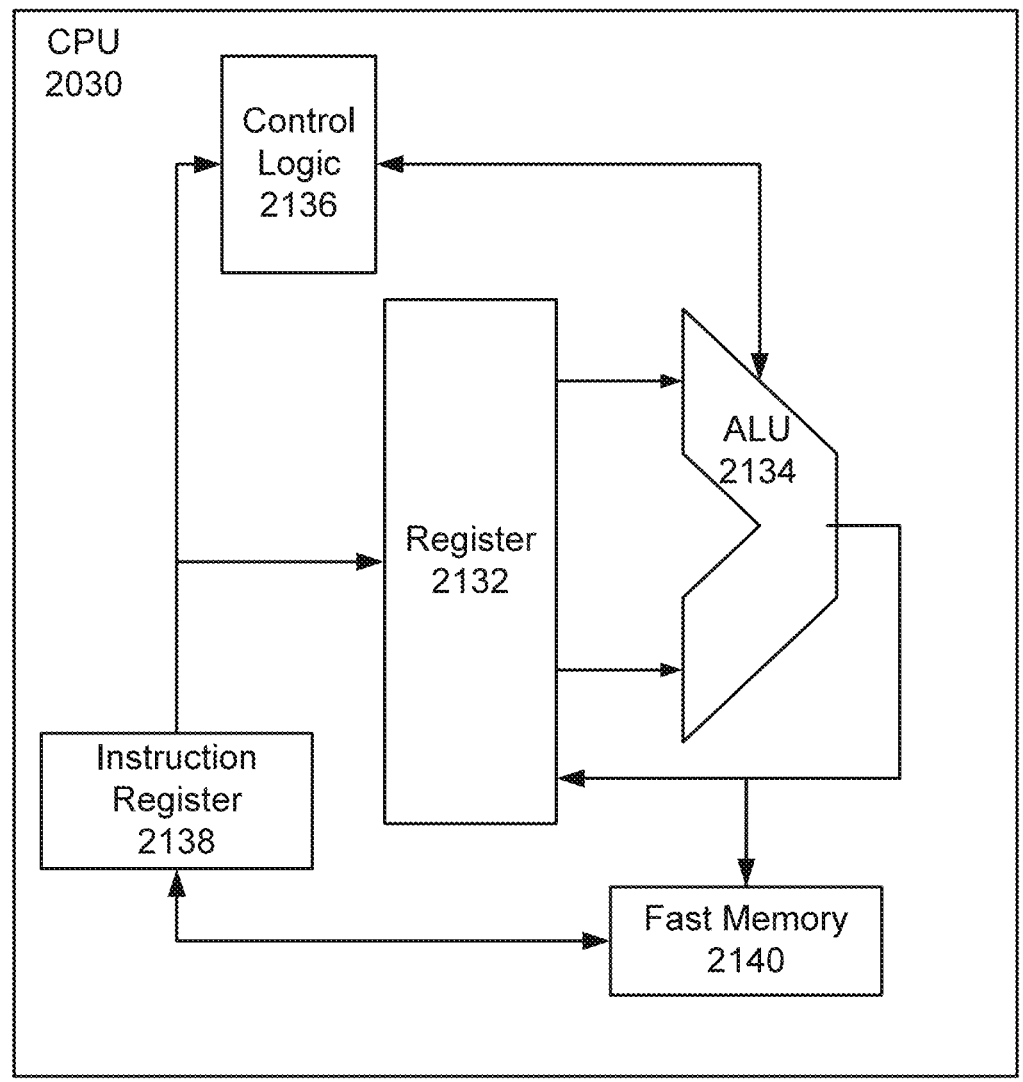
FIG. 21 is an exemplary schematic diagram of a processor used with the computing system, according to certain embodiments.

For example, FIG. 21 shows one implementation of CPU 2030. In one implementation, the instruction register 2138 retrieves instructions from the fast memory 2140. At least part of these instructions are fetched from the instruction register 2138 by the control logic 2136 and interpreted according to the instruction set architecture of the CPU 2030. Part of the instructions can also be directed to the register 2132. In one implementation the instructions are decoded according to a hardwired method, and in another implementation the instructions are decoded according a microprogram that translates instructions into sets of CPU configuration signals that are applied sequentially over multiple clock pulses. After fetching and decoding the instructions, the instructions are executed using the arithmetic logic unit (ALU) 2134 that loads values from the register 2132 and performs logical and mathematical operations on the loaded values according to the instructions. The results from these operations can be feedback into the register and/or stored in the fast memory 2140. According to certain implementations, the instruction set architecture of the CPU 2030 can use a reduced instruction set architecture, a complex instruction set architecture, a vector processor architecture, a very large instruction word architecture. Furthermore, the CPU 2030 can be based on the Von Neuman model or the Harvard model. The CPU 2030 can be a digital signal processor, an FPGA, an ASIC, a PLA, a PLD, or a CPLD. Further, the CPU 2030 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 20, the data processing system 2000 can include that the SB/ICH 2020 is coupled through a system bus to an I/O Bus, a read only memory (ROM) 2056, universal serial bus (USB) port 2064, a flash binary input/output system (BIOS) 2068, and a graphics controller 2058. PCI/PCIe devices can also be coupled to SB/ICH 2088 through a PCI bus 2062.

The PCI devices may include, for example, Ethernet adapters, add-in cards, and PC cards for notebook computers. The Hard disk drive 2060 and CD-ROM 2066 can use, for example, an integrated drive electronics (IDE) or serial advanced technology attachment (SATA) interface. In one implementation the I/O bus can include a super I/O (SIO) device.

Further, the hard disk drive (HDD) 2060 and optical drive 2066 can also be coupled to the SB/ICH 2020 through a system bus. In one implementation, a keyboard 2070, a mouse 2072, a parallel port 2078, and a serial port 2076 can be connected to the system bus through the I/O bus. Other peripherals and devices that can be connected to the SB/ICH 2020 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Figure 22:
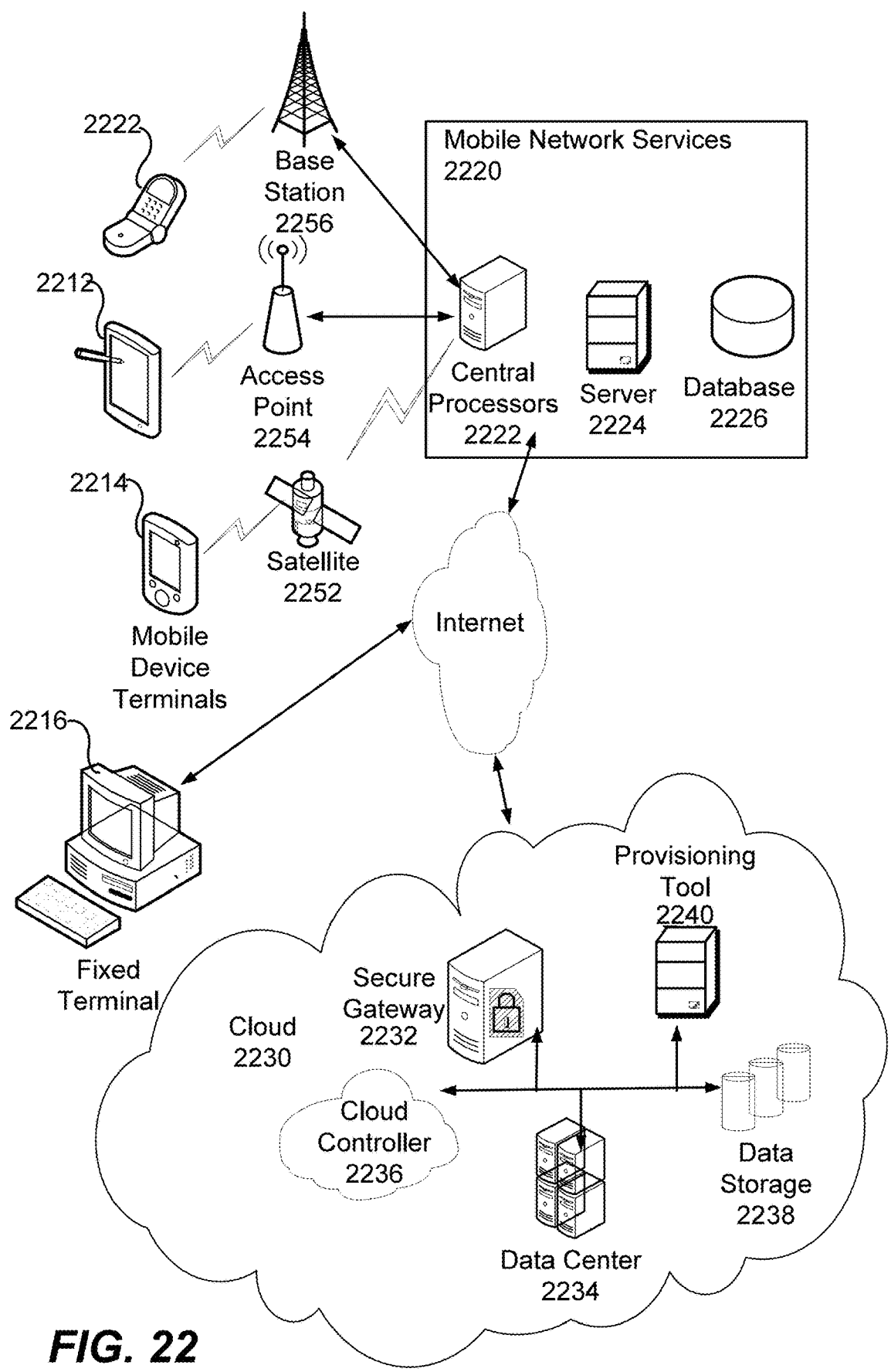
FIG. 22 is an illustration of a non-limiting example of distributed components which may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 22, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A system for voltage level generation in a switched series/parallel sources (SSPS) hybrid multilevel inverter, comprising:
   a level generation module having k voltage generation cells, k+1 DC voltage sources, $V_{dc}$, and 3k unidirectional switches;
   an auxiliary module in series with the level generation module, the auxiliary module having two unidirectional switches and an auxiliary DC voltage source, $V_a$;
   a polarity changing unit in series with the level generation module and the auxiliary module, the polarity changing unit having four unidirectional switches and two load terminals arranged in an H-bridge configuration; and
   a controller having circuitry operatively connected to the 3k unidirectional switches located in the level generation module, the two unidirectional switches in the auxiliary module and the four unidirectional switches in the polarity changing unit;
   wherein the controller has program instructions stored therein that, when executed by one or more processor, cause the one or more processors to perform hybrid modulation, wherein the controller is configured to
      apply a first set of k square wave modulation pulses having a first frequency and first bandwidth to each unidirectional switch in the level generation module, and generate a first voltage level output;
      in a first mode, apply to each unidirectional switch in the auxiliary voltage generation module, a second set of square wave modulation pulses having a variable second frequency and a variable second bandwidth, which places the auxiliary voltage source in series with the first voltage level output, generating an auxiliary module voltage level output which is a sum of the first voltage level output and a voltage level of the auxiliary voltage source, $V_a$;
      in a second mode, apply to each unidirectional switch in the auxiliary voltage generation module, a third set of square wave modulation pulses which bypasses the auxiliary voltage source, generating the auxiliary module voltage level output equal to the first voltage level output;
      apply to each of four unidirectional switches in the polarity changing module, a fourth set of square wave modulation pulses having a fourth frequency and a fourth bandwidth which change an operational status of each unidirectional switch of the four unidirectional switches of the polarity changing module to either ON or OFF; wherein
   when a first two diagonally located unidirectional switches of the four unidirectional switches of the polarity changing module both have an ON status and a second two diagonally located unidirectional switches of the four unidirectional switches both have an OFF status, a positive auxiliary module voltage level output is applied across load terminals of the H-bridge;
   when the first two diagonally located switches of the four switches in the H-bridge configuration both have an OFF status and the second two diagonally located switches in the H-bridge configuration both have an ON status, a negative auxiliary module voltage is applied across the set of load terminals;
   when a second two parallel, oppositely opposed unidirectional switches of the four unidirectional switches of the polarity changing module both have an ON status or both have an OFF status, a negative auxiliary module voltage level output applied across the load terminals of the H-bridge is a zero level output;
   wherein
   the first voltage level output ranges from one to k times a voltage value of a voltage source, $V_{dc}$, within a voltage generation cell, plus one;
   when $V_a = V_{dc}$, the number of voltage levels generated across the load terminals of the H-bridge is given by: $N_{levels} = 2(k+1)$; and
   when $V_a = \frac{1}{2} V_{dc}$, the number of voltage levels generated across the load terminals of the H-bridge is given by: $N_{levels} = 4(k+1)+1$, and
   wherein at least one of the unidirectional switches is an insulated-gate bipolar transistor (IGBT) connected to an anti-parallel diode.

2. The system of claim 1, further comprising:
   wherein the controller is further configured to generate the zero level by applying an ON pulse to each of two parallel oppositely opposed unidirectional switches in the polarity changing unit, wherein each of the two parallel unidirectional switches are connected at a first end to a load terminal and at a second end to a negative terminal of the voltage source in the first cell, wherein the number of voltage levels across the load terminals is given by: $N_{levels} = 4(k+1)+1$ when the zero level voltage is generated.

3. The system of claim 1,
   wherein the controller is further configured to calculate a total standing voltage (TSV) across the unidirectional switches of the hybrid multilevel inverter by: $TSV = \frac{7}{2}(Nlevels+3) \times V_{dc}$, where $V_{dc}$ is the value of each of the voltage sources of the level generation module; and
   minimize the maximum stress across the unidirectional switches by adjusting the number of levels, k, and the value of the voltage source, $V_{dc}$.

4. The system of claim 2,
   wherein the controller is further configured to calculate a total standing voltage (TSV) across the unidirectional switches of the hybrid multilevel inverter by: $TSV = \frac{7}{4} N \times V_{dc}$, where $V_{dc}$ is the value of each of the voltage sources of the level generation module; and
   minimize the maximum stress across the unidirectional switches by adjusting the number of levels and the value of the voltage source, $V_{dc}$.

* * * * *